United States Patent [19]
Ichihara et al.

[11] Patent Number: 5,489,180
[45] Date of Patent: Feb. 6, 1996

[54] VIBRATION DAMPING BODY AND METHOD FOR FABRICATING SAME

[75] Inventors: Sunao Ichihara, Aichi; Kunihiko Yano, Saitama; Takahiro Niwa, Kanagawa; Shyuichi Ishiwa, Nara; Katsunori Ueda, Aichi, all of Japan

[73] Assignees: Toyota Jidosha Kabushiki Kaisha, Aichi; Nichias Corporation, Tokyo, both of Japan

[21] Appl. No.: 221,069

[22] Filed: Mar. 31, 1994

[30] Foreign Application Priority Data

Apr. 5, 1993 [JP] Japan ..... 5-103477
Jul. 29, 1993 [JP] Japan ..... 5-205558

[51] Int. Cl.⁶ ............... F16B 43/02; E02D 27/34; E04B 1/98
[52] U.S. Cl. ............. 411/544; 411/900; 52/167.7
[58] Field of Search .............. 411/368, 369, 411/542, 544, 900, 907; 52/167.7, 167.8; 470/41

[56] References Cited

U.S. PATENT DOCUMENTS

| | | | |
|---|---|---|---|
| 4,474,729 | 10/1984 | Schoening et al. | 52/167.8 |
| 4,593,502 | 6/1986 | Buckle | 52/167.7 |
| 4,761,925 | 8/1988 | Fukahori et al. | 52/167.7 |
| 4,899,323 | 2/1990 | Fukahori et al. | 52/167.7 |
| 4,950,528 | 8/1990 | Iizuka et al. | 52/167.7 |
| 4,978,581 | 12/1990 | Fukahori et al. | 52/167.7 X |
| 5,014,474 | 5/1991 | Fyfe et al. | 52/167.8 |

FOREIGN PATENT DOCUMENTS

| | | |
|---|---|---|
| 0510974 | 10/1992 | European Pat. Off. |
| 57-83254 | 5/1982 | Japan |
| 60-81511 | 5/1985 | Japan |

*Primary Examiner*—Neill R. Wilson
*Attorney, Agent, or Firm*—Flynn, Thiel, Boutell & Tanis

[57] ABSTRACT

A vibration damping construction, which is useful when it is applied to a vibration isolation washer or a pressed construction such as an oil pan, a ventilation buffle plate, etc. for an automobile, is disclosed, which is so constructed that raw materials, in each of which a rubber visco-elastic layer or such layers is or are disposed on one or two surfaces of a metal plate, are laminated on each other, so that rubber visco-elastic layers are opposite to each other, and adhered to each other to form a laminated body; rectangular pawls are formed on the raw material at the uppermost layer and the laminated body; rectangular cut-off windows, with which the cut and raised pawls can be engaged, are formed in the raw material at the lowermost layer; and these are laminated on each other and bound in one body by spot connection by means of the pawls.

20 Claims, 23 Drawing Sheets

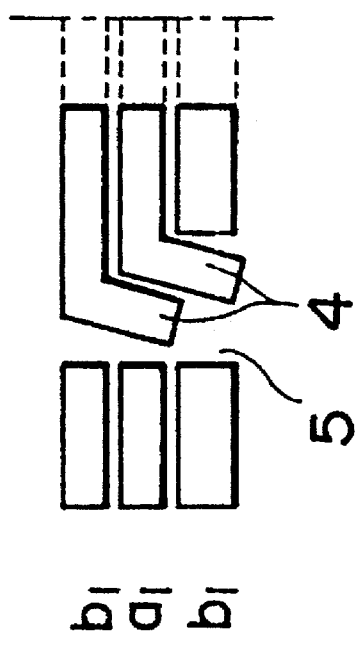
FIG. 7A
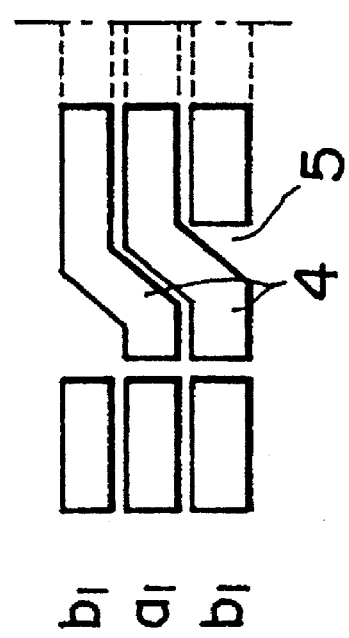
FIG. 7B
FIG. 7C
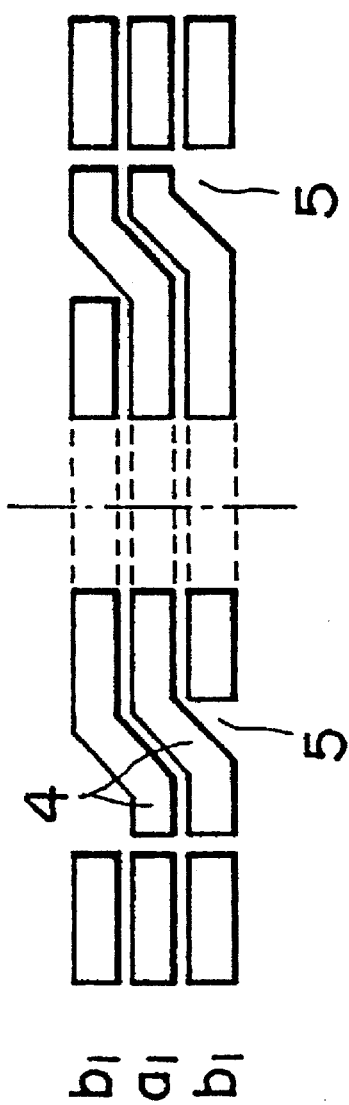
FIG. 7D

VIBRATION DAMPING BODY AND METHOD FOR FABRICATING SAME

FIELD OF THE INVENTION

The present invention relates to a vibration damping body suitable for a washer used for a clamping bolt in a machine, an apparatus, etc. or a body constructed by press such as an oil pan, a ventilation buffle plate, etc. in an automobile and a method for fabricating same.

BACKGROUND OF THE INVENTION

Recently sound proof material in a broad sense is used in not to speak of automobiles, but a number of fields such as electric home appliances and construction materials. It plays an important role for reducing noise, which constitutes a great social problem.

Noise is produced generally in such a manner that various sorts of vibrations generated by movement in different kinds of machines and apparatuses originating it, are transferred to other members, are resonated therewith, and radiated them as noise. Vibration isolation materials are used for preventing this transfer of vibrations to other members (vibration isolation).

The vibration isolation materials described above are roughly classified into a group of coil springs and another group of vibration isolation rubbers. Coil springs are used for lowering vibration level by varying a natural frequency to avoid resonance with vibration having an object frequency, while vibration isolation rubbers attenuate vibration principally by internal friction within a visco-elastic body made of rubber to isolate vibration as the result.

Among the vibration isolation materials described above, generally vibration isolation rubbers are used for vibration isolation in a wide frequency range. In particular, a vibration isolation washer formed in a washer shape is used often in a portion bound by means of a bolt for the purpose of preventing that engine vibration in automobile, etc. is transferred to another member such as a head cover, an oil pan, etc. through a clamping bolt, etc. and radiated as noise.

Usual vibration isolation washers are mainly made of rubber-molded bodies and further in addition to them, various constructions such as a washer made of rubber alone, a washer in which metal plates are stuck by vulcanization adhesion on the upper and lower surfaces of a simple rubber body, etc. are used, depending on the field of utilization.

In particular, for the head cover of an engine a vibration isolation washer, in which a metal support is stuck to a surface of a rubber piece by vulcanization adhesion, is widely utilized. One of the most important features of this type of vibration isolation rubbers consists in that not only the sort and the shape thereof can be arbitrarily chosen, depending on the field of utilization, but also the vibration isolation capability can be freely designed. However this type of vibration washers have following drawbacks.

Capability of a rubber-molded vibration isolation washer with metal support depends significantly on properties which rubber has (hardness, tensile strength, compression and recovery, compression set, etc.) and further on heat resistant properties thereof as well as other resistances to environments, in order that it can exhibit stably vibration isolation and other required characteristics. Generally it is believed that these variations are unavoidable.

For this reason, although it can be used without any problem for a field of utilization where no great load is applied thereto, in the case where it is used in an environment where it is subjected to a thermal load as a vibration isolation washer for the head cover of an engine in an automobile, a bolt is loosen by creep of rubber and vibration isolation effect is lost. In addition, in the case where a gasket etc. for preventing outflow of engine oil etc. is clamped together, at the worst case sealing property is lowered so that liquid leaks out or the bolt falls off, which may cause a serious problem.

Apart therefrom, at clamping the bolt, since contact resistance between the rubber and a seat surface is great, the rubber is twisted or friction coefficient is increased and thus torque on the bolt cannot by controlled precisely. Therefore no required load (force) can be secured or the bolt is fastened with an unnecessarily great force in expectation thereof. As the result, the metal support is brought into contact with the seat surface, which gives rise to a problem that vibration isolation is lost, etc.

Further, since most washers have great exposed side surfaces of rubber in order to improve vibration isolation and deformation of the rubber is remarkable, problems may be produced that the height of the clamped bolt is unstable, that the rubber is crushed because of fastening with a too great force, that it is apt to be subjected to attack by different oils, salt water, etc., and so forth.

According to Utility Model JP-A-Sho 57-83254, a structure is conceived, in which a plurality of raw material sheets, in each of which a rubber visco-elastic layer is stuck to a metal plate formed in a dish shape, are laminated on each other, in order to improve the vibration isolation effect and a long term creep resistant property. However not only this conceived structure cannot exhibit the vibration isolation effect owing to prolongation and complication of the vibration transmission path stated later according to the present invention, but also since different laminated sheets move freely at fastening, unnecessary friction is produced at interfaces of rubber/rubber and rubber/metal, which gives rise to an inconvenience that the surface of the rubber is worn away or peeled.

Further, according to JP-A-Sho 60-81511, a structure is proposed, in which rubber layers having the vibration damping effect and two or three metal plates (or vibration damping alloy plates) are laminated and adhered alternately. However no measures against torsion of the rubber at clamping the bolt are found therein and problems such as peeling, break, etc. are pointed out.

Now problems on a pressed construction such as an oil pan, a ventilation buffle plate, etc. for an automobile will be described.

Heretofore, in view of giving a pressed construction such as an oil pan, a ventilation babble plate, etc. for an automobile a vibration damping property, it is known that a vibration damping member composed by putting a macromolecular visco-elastic layer made of rubber, resin, etc. between two metal plates in a sandwich shape is used as a pressed construction itself, which is formed by press, or a macromolecular visco-elastic layer made of rubber, synthetic resin, etc. is disposed on either one of the inner or the outer surface of the construction to obtain a vibration damping property.

Further, for the pressed construction described above, there are many cases where a sealing function is required together therewith in order to prevent oil leak, etc. from the construction. The former has an advantage that the sealing and the vibration damping function can be utilized together by using the sealing function of the macromolecular visco-elastic layer on the surface, while the latter requires a separate sealing member such as a gasket, etc.

It is absolutely necessary for the vibration isolation washer described above for the field of utilization where reliability is considered to be important as parts for an engine in an automobile to have not only a high vibration isolating property but also various characteristics such as resistance against creep, initial clamping properties (easiness to fasten, torque transmissibility, torsion strength), resistance against environment, etc. together and appearance of a vibration isolation washer fulfilling satisfactorily these conditions is desired.

On the other hand, in the pressed construction as described above such as an oil pan, a ventilation buffle plate for an automobile, a ventilation damping structure, in which a macromolecular visco-elastic layer is put between two metal plates (constrained damping material), has a disadvantage that cost is high in the aspect of fabrication, although it has a high loss factor. Further, in the case where the constrained vibration damping structure should have a sealing property, it requires a separate gasket.

On the contrary, for a vibration damping construction, in which a macromolecular visco-elastic layer is disposed on either one of the upper and the rear surface of one metal plate (unconstrained damping material), products having a sealing function by utilizing the macromolecular visco-elastic layer disposed on the upper surface are widely utilized. However it has a low loss factor and the vibration damping effect thereof is fairly lower than that of the constrained damping material.

OBJECT OF THE INVENTION

A first object of the present invention is to provide a vibration damping construction, which satisfies simultaneously all of the vibration isolation property under a high load environment, the creep resistant property (compression crush resistant property, long term creep resistant property), the initial clamping properties (easiness to clamp, torque transmissibility, torsion strength), and environment resistant property (oil, salt water), in the case where it is applied to a vibration isolation washer, and a method for fabricating same.

A second object of the present invention is to provide a vibration damping construction, capable of giving a unconstrained damping material a constrained vibration damping function, in the case where it is applied to a pressed construction such as an oil pan, a ventilation buffle plate for an automobile, and in addition which can exhibit a vibration damping effect in a wide temperature range, which had not be able to be obtained with a prior art constrained damping steel plate.

SUMMARY OF THE INVENTION

A vibration damping construction according to the present invention is constructed by using a combination of a rigid body with a raw material including a macromolecular visco-elastic layer or two such layers formed on one surface or two surfaces of the rigid body or a combination of such raw materials, laminating members comprising such combinations, and forming them in one body by spot connection.

In the case where a vibration damping body for a vibrating isolation washer is constructed according to the present invention, raw materials, in each of which a rubber visco-elastic layer or such layers is or are disposed on one or two surfaces of a metal plate, are used, which raw materials are laminated on each other, so that rubber visco-elastic layers are opposite to each other, and adhered to each other to form a laminated body; laminated bodies thus obtained or laminated bodies and raw materials are laminated on each other to form a laminated layer construction and caulked mechanically in one body by spot connection by means of a plurality of pawls cut and raised in the thickness direction thereof.

In the case where a vibration damping body for a pressed construction is constructed according to the present invention, a macromolecular visco-elastic layer is formed on a base plate, which is a rigid body, by adhesion, and a plate-shaped member, which is a rigid body, is laminated on the surface of this macromolecular visco-elastic layer, which plate-shaped member is bound with the base plate by spot connection.

In the case where the vibration damping body is applied to a vibration damping washer, in spite of the fact that it is thinner than a prior art vibration damping rubber and it has a high rigidity, it is possible to obtain not only a vibration damping and sound proof property higher than that of the prior art vibration damping rubber but also a good and stable clamping property. Further it is possible to obtain a small exposed area of the macromolecular visco-elastic layer made of rubber, etc. and thus it can exhibit an excellent environment resistant property.

On the other hand, in the case where the vibration damping body described above is applied to a pressed construction such as an oil pan, a ventilation buffle plate for an automobile, the vibration damping action thereof can be exhibited in a wide temperature range.

BRIEF DESCRIPTION OF THE DRAWINGS

FIGS. 7A to 7D are side views of vibration isolation washers indicating examples of various sorts of constructions of the cut and raised pawl;

FIG. 24A indicating a rivet connection; FIG. 24B a screw connection; FIG. 24C an eyelet connection; FIG. 24D a spot welding connection; FIG. 24E a caulking connection; and FIGS. 24F, 24G and 24H rivet connections in other different pressed constructions;

DETAILED DESCRIPTION

Figure 1A:
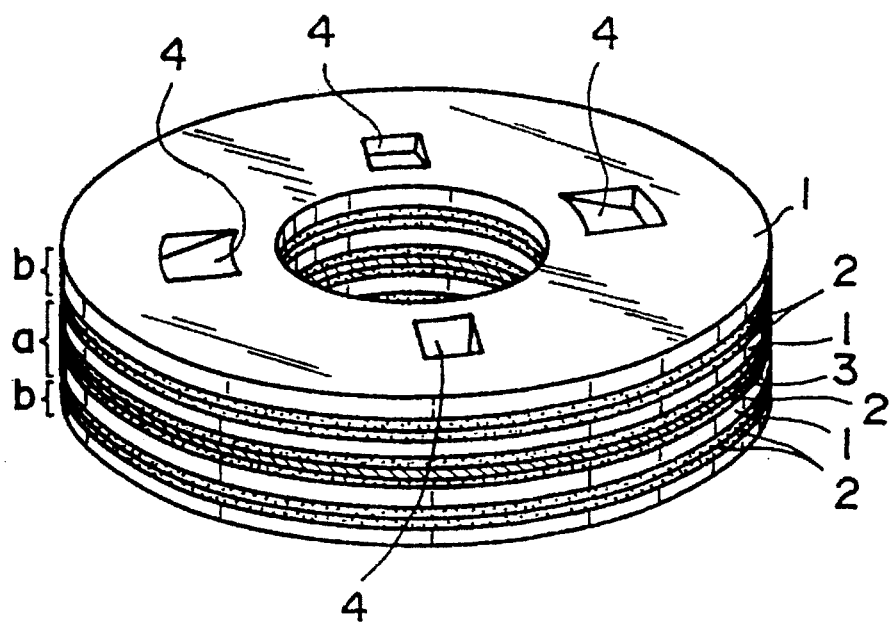
FIG. 1A is a perspective view of a vibration isolation washer showing conceptionally the construction according to the present invention.
Figure 1B:
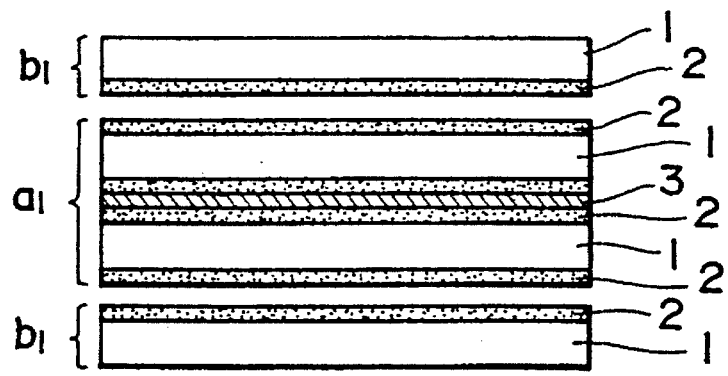
FIG. 1B is a partial side view for explaining a basic component of the vibration isolation washer indicated in FIG. 1A.
Figure 1C:
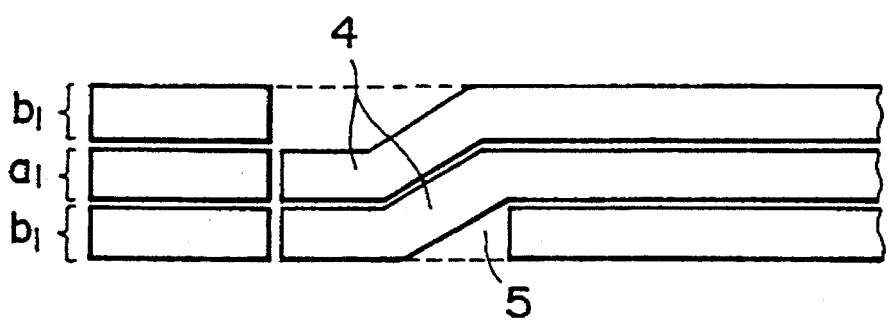
FIG. 1C is a partial side view showing a state, in which the vibration isolation washer is bound in one body with the basic component by means of cut and raised pawls.
Figure 2:
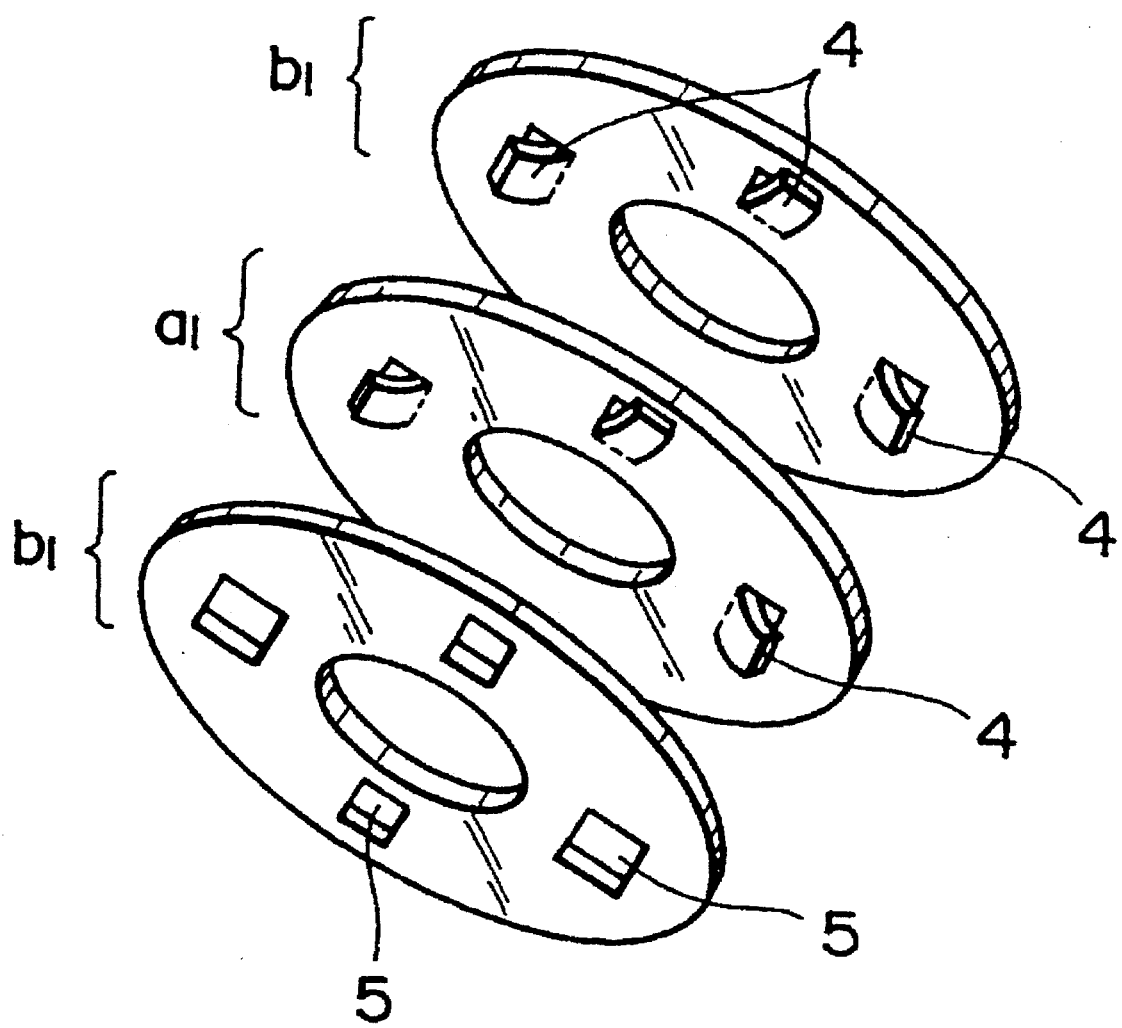
FIG. 2 is an exploded perspective view indicating how the vibration isolation washer stated above is constructed by lamination.

An example, in which the present invention is applied to a vibration isolation washer, will be explained below.

In FIGS. 1A to 1C and 2, $a_1$ and $b_1$ indicate basic components of a vibration isolation washer and reference numeral 1 is a metal plate; 2 is a rubber visco-elastic layer; and 3 is an adhesive layer. The basic component $a_1$ is constructed by adhering raw materials, each of which includes rubber visco-elastic layers 2 disposed on two surfaces of the metal plate 1, to each other through the adhesive layer 3 so that rubber visco-elastic layers are opposite to each other so as to have a structure of a constrained vibration damping plate itself. The basic component $b_1$ includes a metal plate 1, on one surface of which the rubber visco-elastic layer 2 is formed so as to have a structure of an unconstrained damping material itself. The basic components $b_1$, $b_1$ are positioned adjacent the basic component $a_1$ so that rubber visco-elastic layers are opposite to each other.

An aluminium plate, an iron plate, a steel plate, a stainless steel plate, etc. may be cited for the metal plate constituting the raw material described above and a plate about 0.1 to 1.0mm thick is used therefor.

On the other hand, acrylonitrile butadiene rubber (NBR), styrene butadiene rubber (SBR), natural rubber (NR), butyl rubber (IIR), butadiene rubber (BR), isoprene rubber (IR), chloroprene rubber (CR), acryl rubber (ACM), etc. may be cited for the rubber visco-elastic layer constituting the raw material and a thickness of about 0.03 to 0.50mm is preferable therefor.

The basic components described above can be obtained easily by coating one surface or two surfaces of the metal plate with liquid rubber material described above and by vulcanizing the liquid rubber material to form the rubber visco-elastic layer.

For means for adhering raw materials to each other there are means for adhering them, using adhesive such as polyamide resins, urea resins, melamine resins, phenol resins, epoxy resins, etc. or means for adhering them, using a hot-melt resin film made of one of these resin materials. However the latter adhesive means can adhere them together and it is suitable for mass production and more advantageous in cost.

A plurality of rectangular cut and raised pawls 4 are disposed in the circumferential direction on the basic component $b_1$ in the upper layer and the basic component $a_1$ in the middle layer among the basic components $b_1$ - $a_1$ - $b_1$ described above. On the other hand, rectangular cut-off windows 5 having the same shape as the pawls stated above are formed in the basic component $b_1$ in the lower layer. The pawls 4 formed on the basic component $a_1$ in the middle layer are engaged with the cut-off windows 5 formed in the basic component $b_1$ in the lower layer and the pawls 4 formed on the basic component $b_1$ in the upper layer is engaged with cut-off windows formed due to the cut and raised pawls 4 on the basic component $a_1$ in the middle layer by laminating the basic components $b_1$ - $a_1$ - $b_1$ on each other and pressing them in the thickness direction. The basic components $b_1$ - $a_1$ - $b_1$ positioned adjacent each other are bound by spot connection due to engaging action of the pawls described above.

Figure 3:
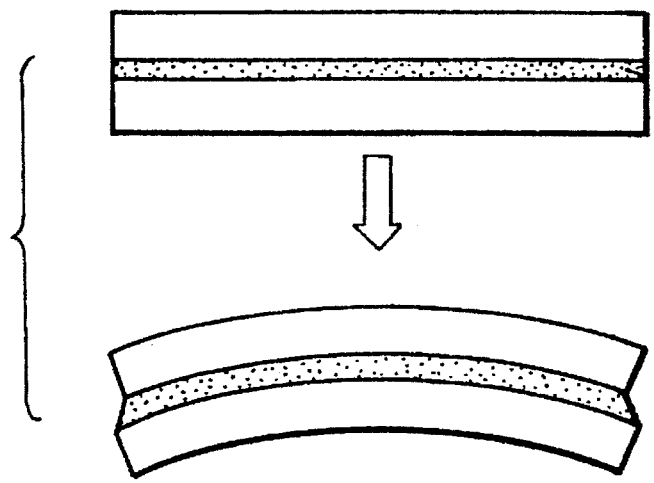
FIG. 3 is a diagram for explaining the vibration damping function of a constrained damping material.
Figure 4:
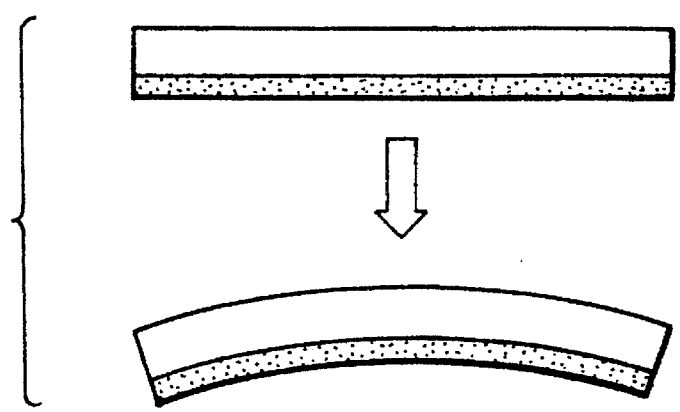
FIG. 4 is a diagram for explaining the vibration damping function of an unconstrained damping material.

In the vibration isolation washer constructed as described above, particularly three vibration isolation mechanisms indicated below are combined efficiently. That is, the basic component $a_1$ has the constrained damping structure indicated in FIG. 3. In this structure the vibration damping power is exhibited by "shear deformation" of the rubber visco-elastic material due to bending vibration. On the contrary, the basic component $b_1$ has the unconstrained damping structure indicated in FIG. 4 and in this structure the vibration damping power is exhibited by "extensional deformation" of the rubber visco-elastic material due to bending vibration Although, when the constrained type and the unconstrained type are compared, they are different in that the effect is exhibited by the thin rubber visco-elastic layers in the former, while a thickness three or four times as great as that of the metal plate is required for the unconstrained type, a higher vibration damping property can be obtained with increasing number of lamination of the basic components described above, i.e. with increasing total thickness of rubber visco-elastic layers arranged alternately with metal plates.

Further, in the vibrating damping washer constructed as described above, the basic components $b_1$, $a_1$ and $b_1$ are not adhered to each other, but bound by mechanical spot connection and the surfaces other than the spot connections are only contacted so that extremely small "Coulomb friction" is produced at interfaces between different basic components when vibration is generated. In this way vibration energy is transformed into friction heat, so that vibration absorbing effect can also be obtained.

Figure 5A:
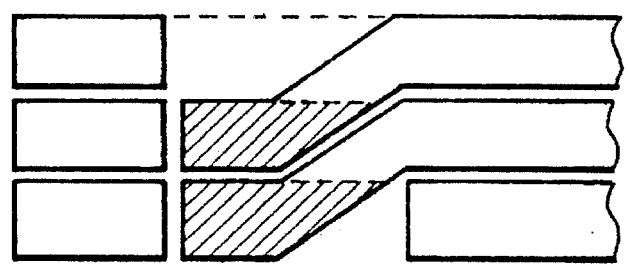
FIGS. 5A and 5B are diagrams for explaining the vibration transmission path between different basic components in the vibration isolation washer, FIG. 5A being a partial side view therefor, FIG. 5B being a plan view therefor.
Figure 5B:
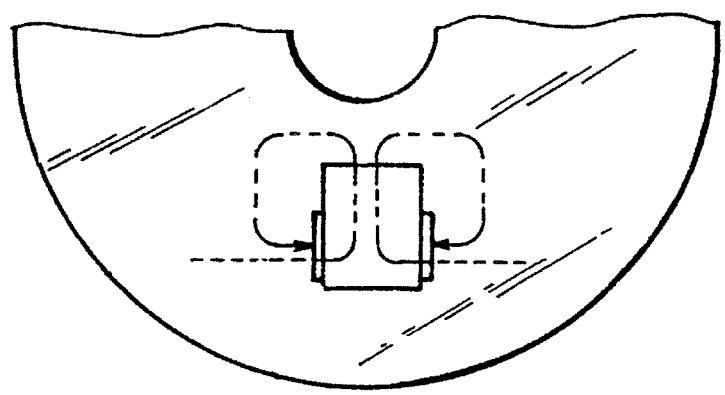

Still further, in the vibration damping washer constructed as described above, as indicated in FIGS. 5A and 5B, e.g. vibration flowing into the basic component, which is on the lower side, is transmitted to the basic component, which is on the upper side, through contacting parts (hatched parts in FIG. 5A) on the side surfaces of the cut and raised pawls, which are formed on the upper side member, and thus vibration damping effect can be obtained by prolongation and complication of the vibration transmission path.

FIGS. 6A, 6B, 6C, 6D, 6E and 6F show various sorts of examples of the direction and the position of the cutting, in the case where the cut and raised pawls 4 for caulking are formed on the basic components, in plan views, while FIGS. 7A, 7B, 7C and 7D show them in cross-sectional views, FIGS. 7A, 7B and 7C indicating examples of the construction, where they are caulked on one side, FIG. 7D indicating an example of the construction, where it is caulked on the two sides.

Figure 8:
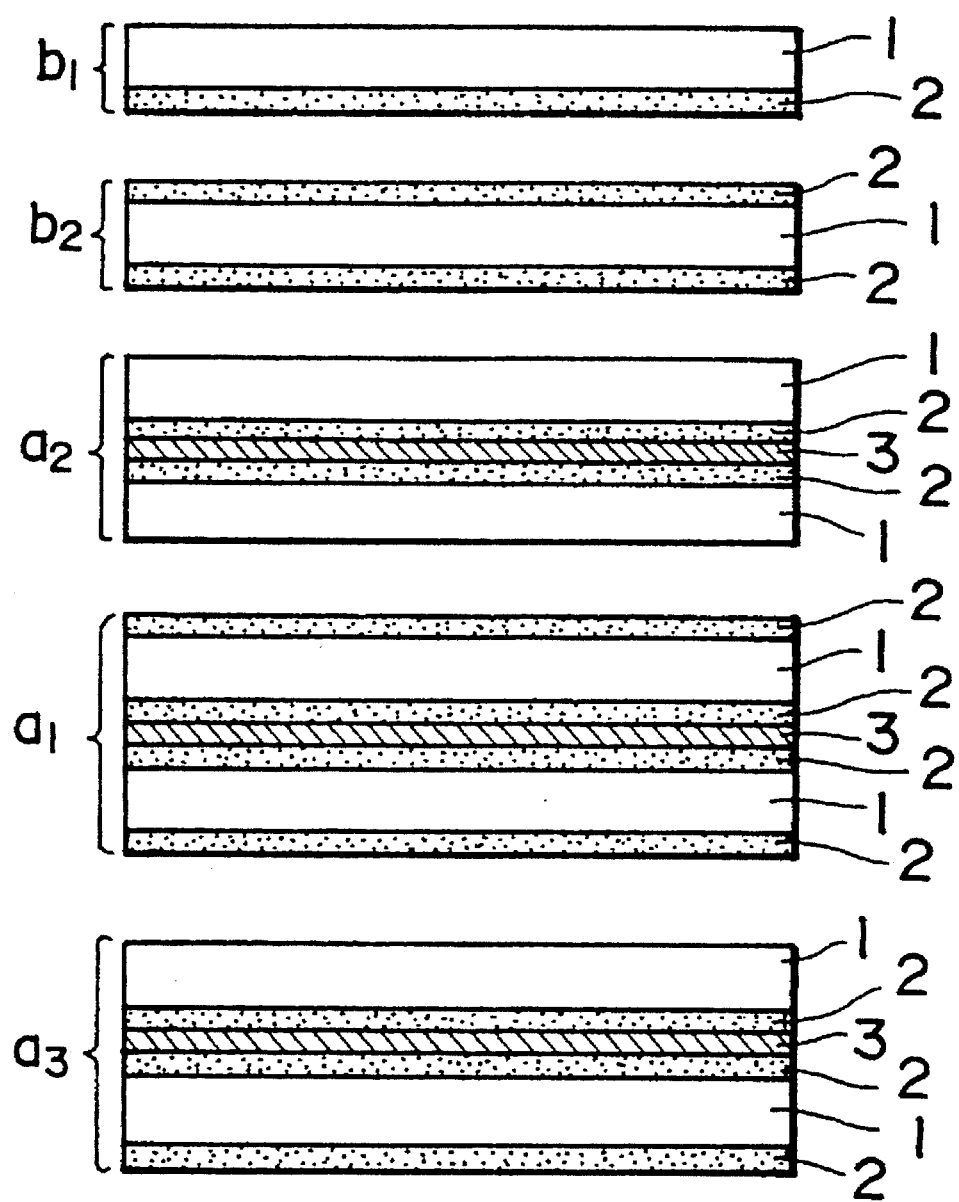
FIG. 8 is a side view of a basic component constituting the vibration isolation washer.
Figure 9:
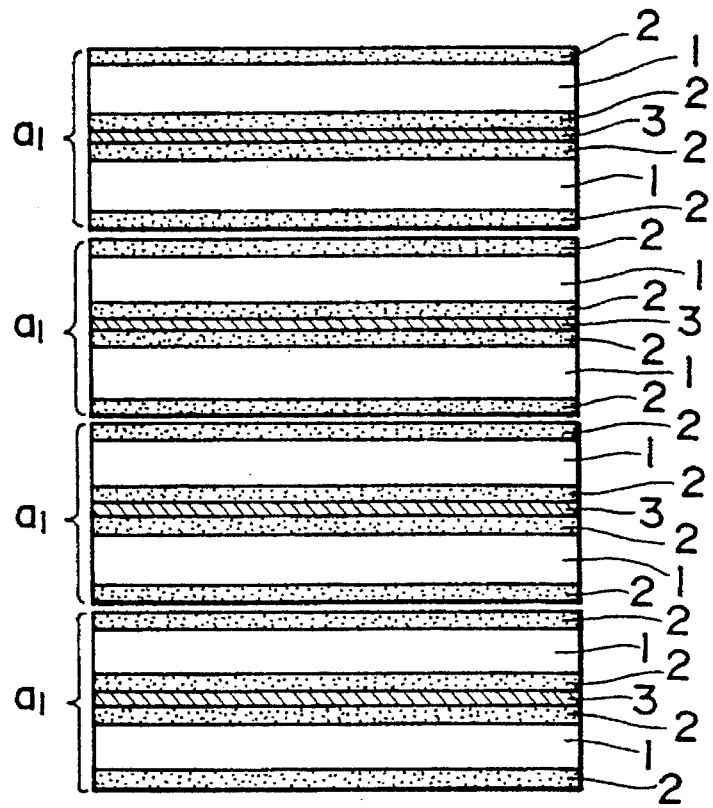
FIG. 9 is a side view of a basic component constituting a vibration isolation washer according to a first embodiment of the present invention.
Figure 10:
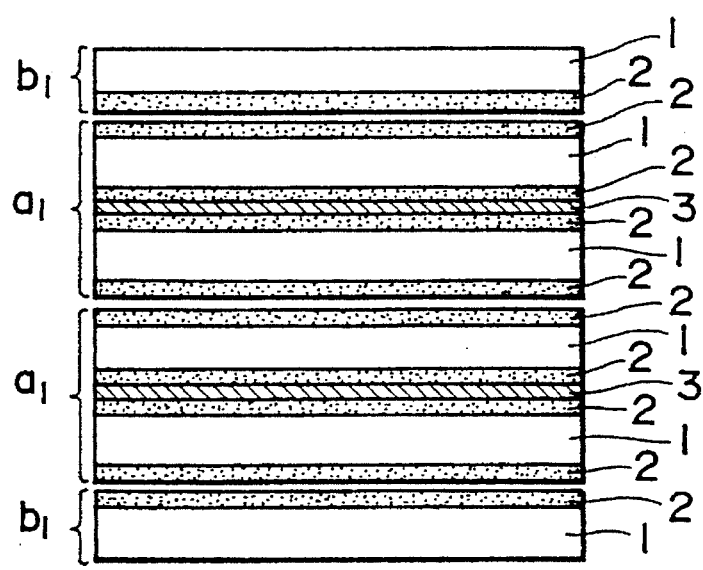
FIG. 10 is a side view of a basic component constituting a vibration isolation washer according to a second embodiment of the present invention.

FIG. 8 shows preferable basic components. In the figure, $b_1$ is a basic component, in which a rubber visco-elastic layer 2 is formed on one surface of a metal plate 1 and $b_2$ is also a basic component, in which two rubber visco-elastic layers 2 are formed on the two surfaces of a metal plate 1. Component $a_1$ is a multi-layered body, in which basic components $b_2$ described above are bound to each other by an adhesive layer 3; $a_2$ is a multi-layered body, in which raw materials $b_1$ described above are stuck to each other through an adhesive layer 3; and $a_3$ is a multi-layered body, in which raw materials $b_1$ and $b_2$ are stuck to each other through an adhesive layer 3. In order to increase the effect of "Coulomb friction", it is preferable that the contacting interface at combining these basic components is composed of rubber/rubber or rubber/metal in principle.

FIGS. 9 to 13 show how vibration isolation washers are constructed by combining the basic components indicated in FIG. 8. However spot connecting means are omitted in the figures.

Now several embodiments of the present invention and examples for comparison will be explained, referring to figures.

EMBODIMENT (1)

A vibration isolation washer according to the present embodiment has a structure, in which four basic components $a_1$ are laminated on each other and bound in one body by using cut and raised pawls described previously, as indicated in FIG. 9.

Metal plate 1 . . . aluminium plate 0.25mm thick

Rubber visco-elastic layer 2 . . . NBR type rubber 0.12mm thick

Adhesive layer 3 . . . polyamide type adhesive film 0.03mm thick

Overall thickness of washer . . . 4.0mm

Overall thickness of rubber . . . 1.9mm

Number of Coulomb friction interfaces . . . 3

Dimensions of washer . . . Outer diameter 17mm, inner diameter 6.5mm (for M6 bolt).

Method for Fabricating the Basic Component:

At first, one surface or two surfaces of a metal plate, which has been subjected to surface processing is/are coated and made react with primer efficient for adhesion to rubber. Thereafter it/they is/are coated thin and uniformly with rubber dissolved in a solvent and subjected to a vulcanization process at a predetermined temperature to obtain the raw material (unconstrained damping material).

This structure is useful, in the case where it is sealed against liquid (oil, etc.) flowing along the bolt, by disposing rubber layers for the outermost layers.

Next two materials, whose two surfaces are coated, are placed so that rubber surfaces are opposite to each other, and adhered, putting a polyamide type adhesive film therebetween. At adhesion, tension is loaded at the two ends of the polyamide type adhesive film after having laminated them each other so that no inconveniences such as winkles, bulges, etc. are produced and the raw materials are adhered to each other at a temperature lower than their melting point by means of a hot press.

Figure 6C:
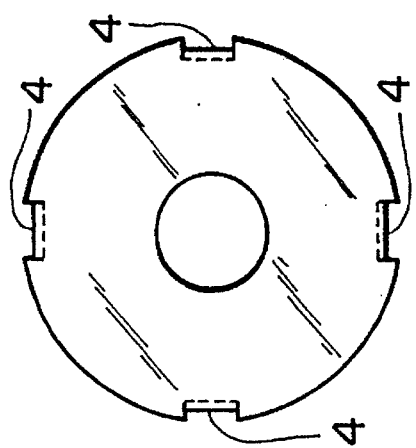
FIGS. 6A to 6F are plan views of vibration isolation washers indicating examples of various sorts of the cutting direction and the position of cut and rails pawls.
Figure 6F:
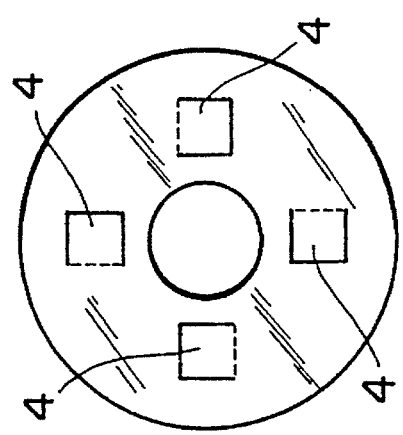
Figure 6B:
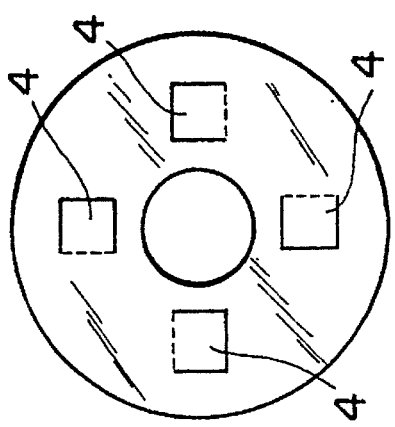
Figure 6E:
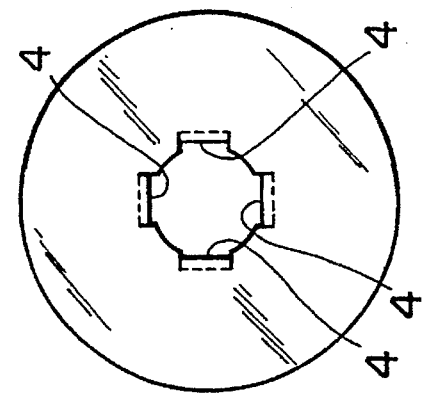
Figure 6A:
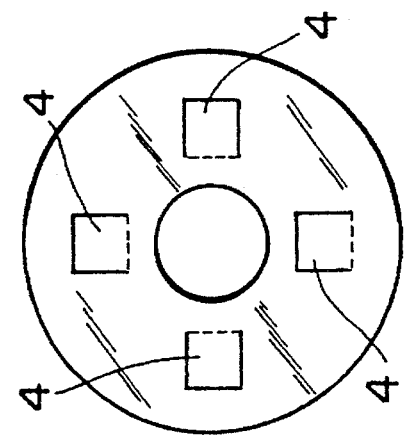
Figure 6D:
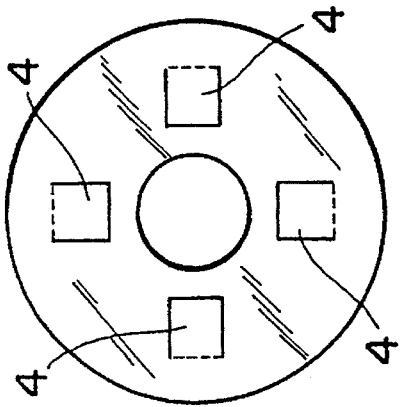

Caulking Spot Connecting Method By Means of Pawls:

Rectangular portions are cut away at the positions for caulking by means of pawls only from the lowest basic component among those positioned over each other. For the other basic components three sides of the rectangles at the positions for caulking by means of pawls are cut, leaving the remaining one side not cut, and the rectangles are raised to be used for the caulking. After having positioned these basic components thus processed one after another according to the content of the structure, they are caulked so that the pawls encroach on the relevant layers and that there remain no gaps between adjacent basic components. All of these cutting away, cutting and raising, and caulking works are effected by using metal dies. The number of caulked positions is 4. The arrangement thereof in a plan view is indicated in FIG. 6A and the cross-sectional structure is shown in FIG. 7A.

EMBODIMENT (2)

A vibration isolation washer according to the present embodiment has such structure, that basic components $b_1$, $a_1$, $a_1$ and $b_1$ are positioned adjacent each other and coupled together to form a single body by using cut and raised pawls described previously, as indicated in FIG. 10.

The present embodiment differs from EMBODIMENT (1) in that the aluminium plates 1 in the outermost basic components $b_1$ are 0.6mm thick. It is in view of intending to resist crush due to concentrated load at the head portion of the bolt that aluminium plates thicker than the others are used for the outermost surfaces.

EMBODIMENT (3)

Figure 11:
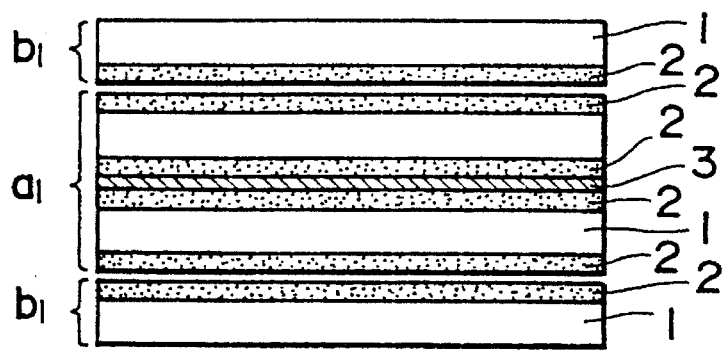
FIG. 11 is a side view of a basic component constituting a vibration isolation washer according to a third embodiment of the present invention.

A vibration isolation washer according to the present embodiment has such structure, that the number of intermediate basic components is reduced by 1 with respect to that described in EMBODIMENT (2), as indicated in FIG. 11, and there are no other modifications.

EXAMPLE FOR COMPARISON (1)

Figure 12:
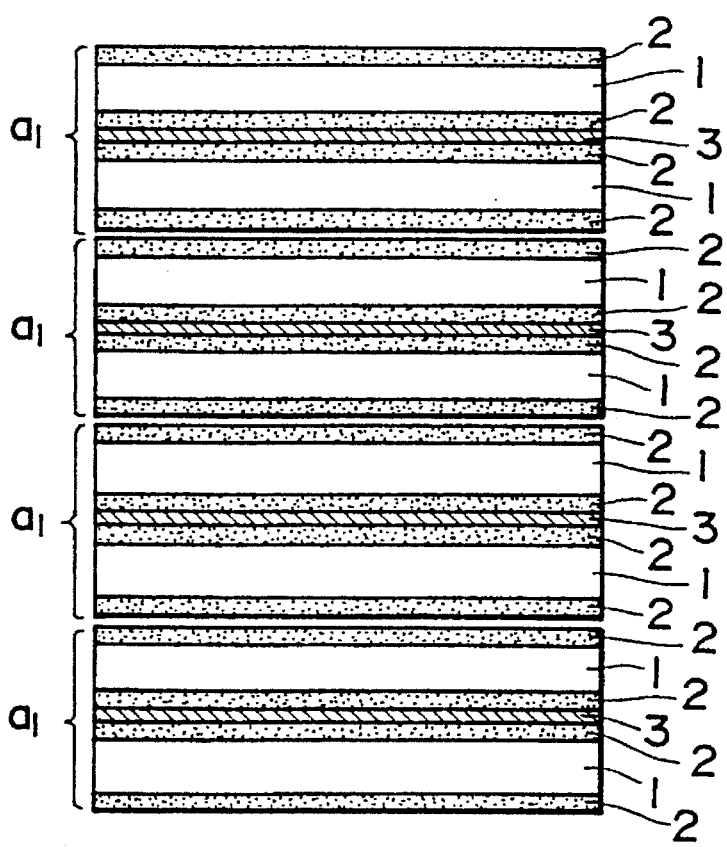
FIG. 12 is a side view of a basic component constituting a vibration isolation washer according to a first example for comparison.

In a vibration isolation washer according to the present example for comparison, four basic components $a_1$ described in EMBODIMENT (1) are used, as indicated in FIG. 12, which are assembled by means of a bolt, etc. in a separate state without using any means for "caulking by means of pawls" and "adhesion", to be tested. For this reason attention is paid particularly so that no displacement, etc. is produced between different layers.

EXAMPLE FOR COMPARISON (2)

Figure 13:
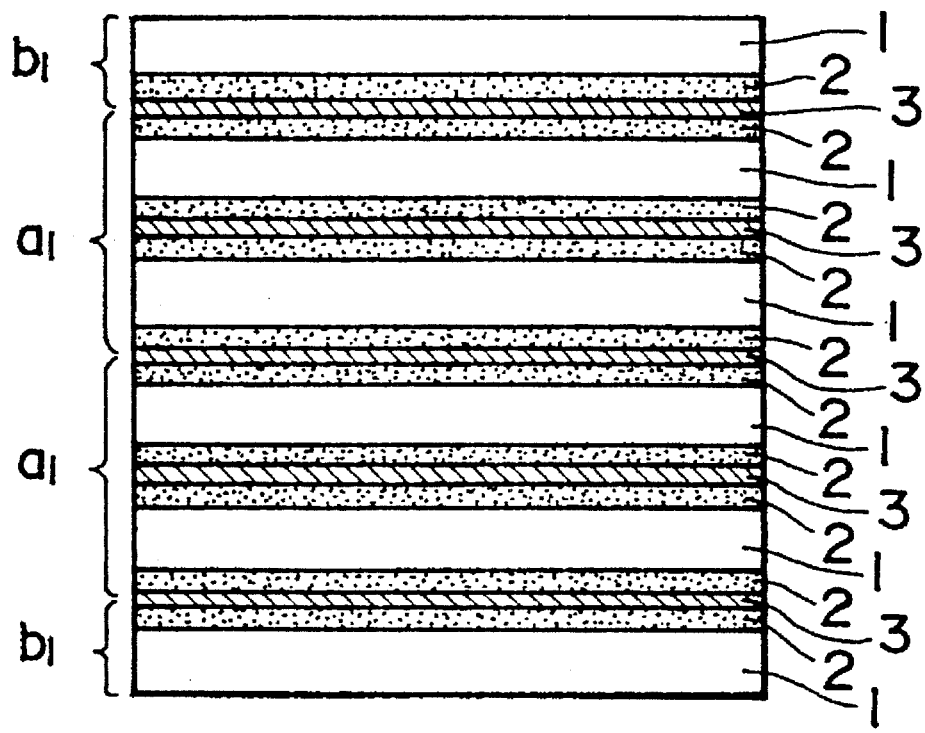
FIG. 13 is a side view of a basic component constituting a vibration isolation washer according to a second example for comparison.

A vibration isolation washer according to the present example for comparison is constructed by adhering the whole surfaces of the basic components $b_1$, $a_1$, $a_1$ and $b_1$ used in EMBODIMENT (2) in one body, as indicated in FIG. 13. For this reason the overall thickness thereof is greater than that described in EMBODIMENT (2) by the thickness of the adhesive films newly used. At adhesion, a polyamide type adhesive film 3 (0.03mm thick) is put between every adjacent two basic components and they are adhered to each other at a temperature lower than their melting point by means of a hot press.

EXAMPLE FOR COMPARISON (3)

Figure 14:
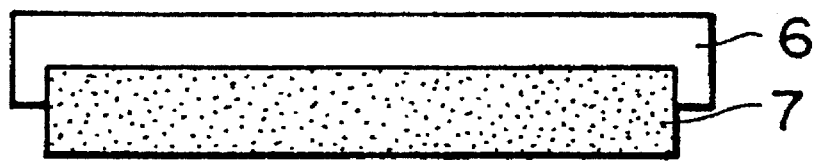
FIG. 14 is a side view of a basic component constituting a vibration isolation washer according to a third example for comparison.
Figure 15:
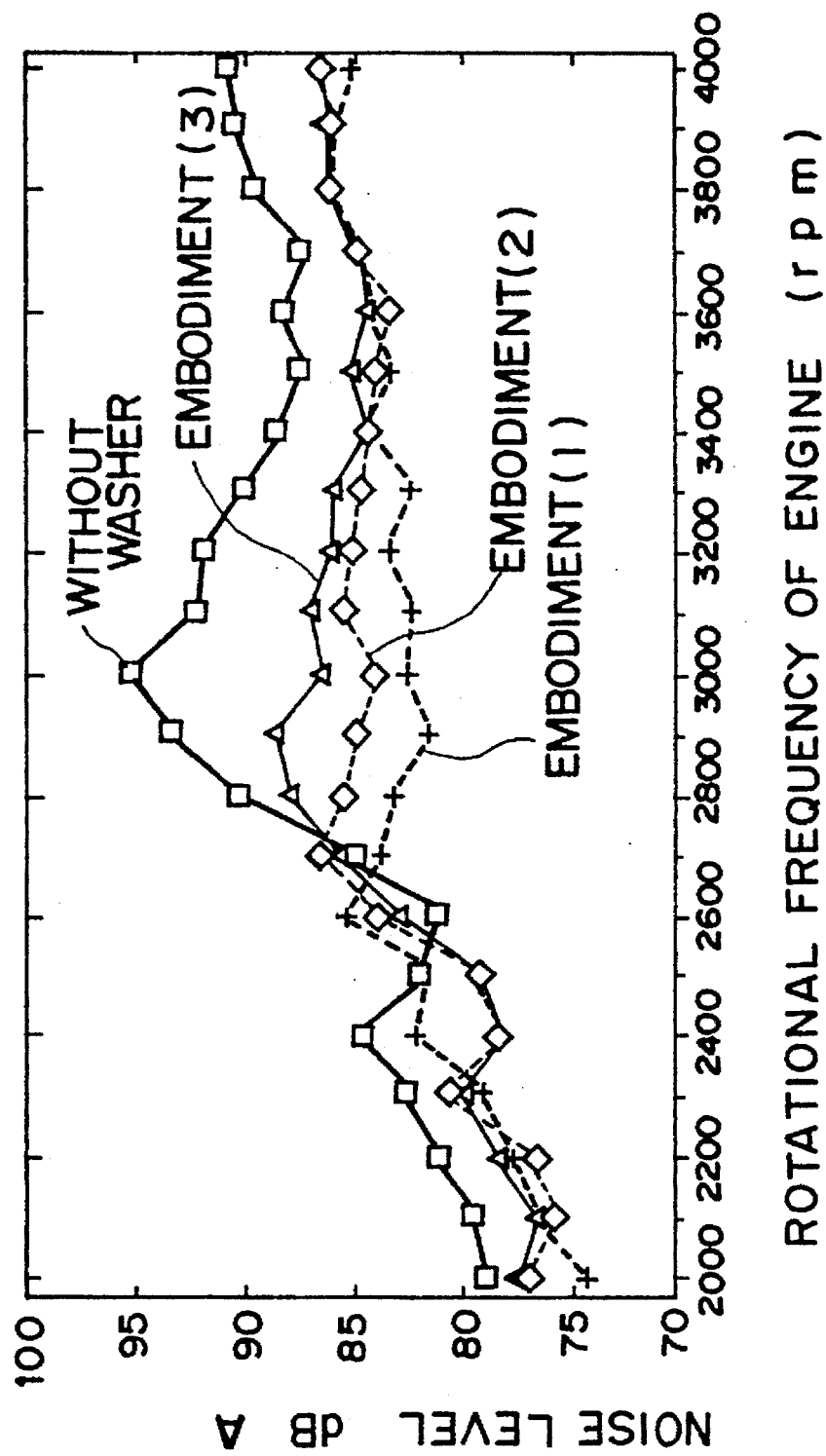
FIG. 15 is a graph indicating vibration isolation sound insulation characteristics of the vibration isolation washers according to the EMBODIMENTS (1) to (3)
Figure 16:
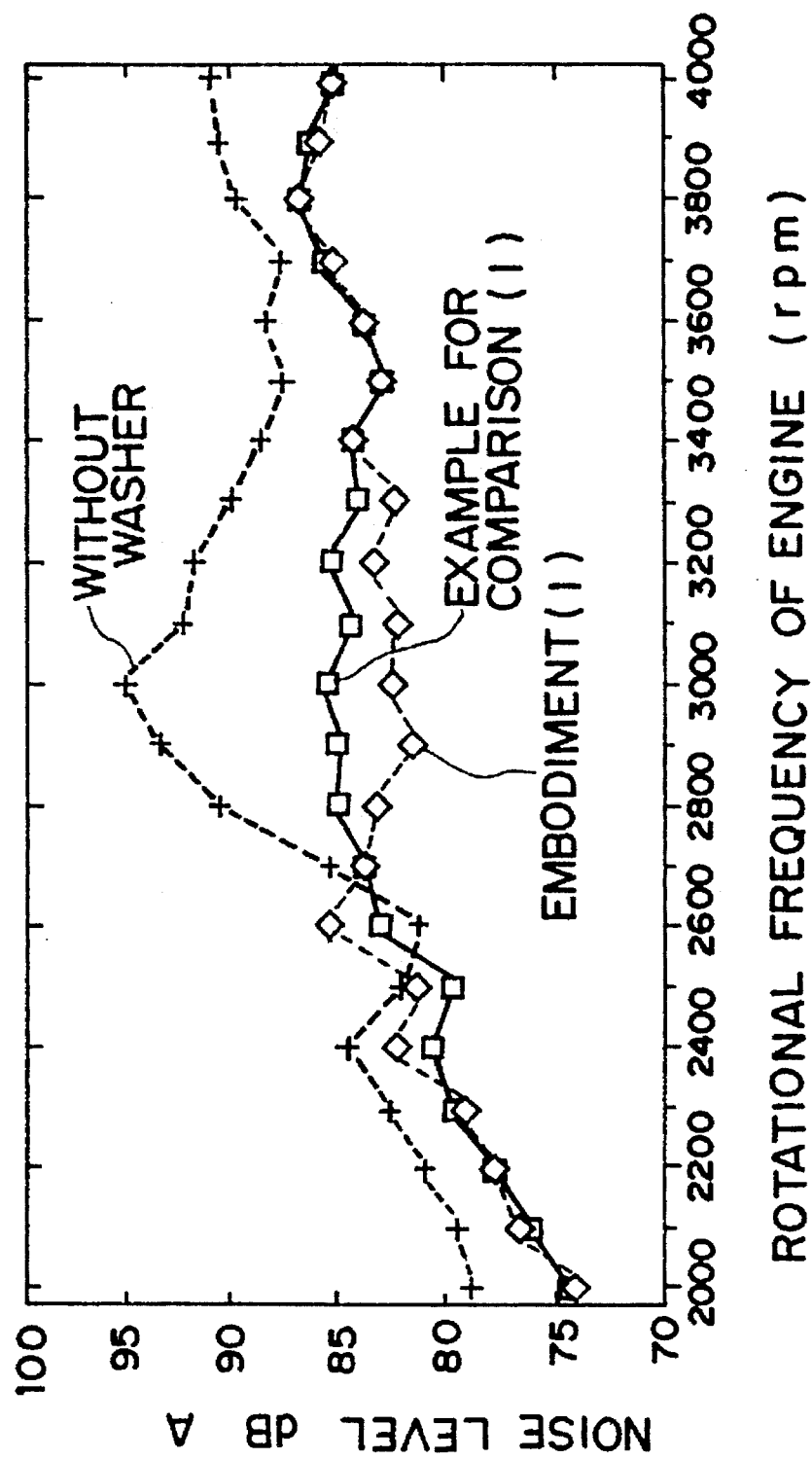
FIG. 16 is a graph indicating vibration isolation sound insulation characteristics of the vibration isolation washers according to the EMBODIMENTS (1) and the EXAMPLE FOR COMPARISON (1)
Figure 17:
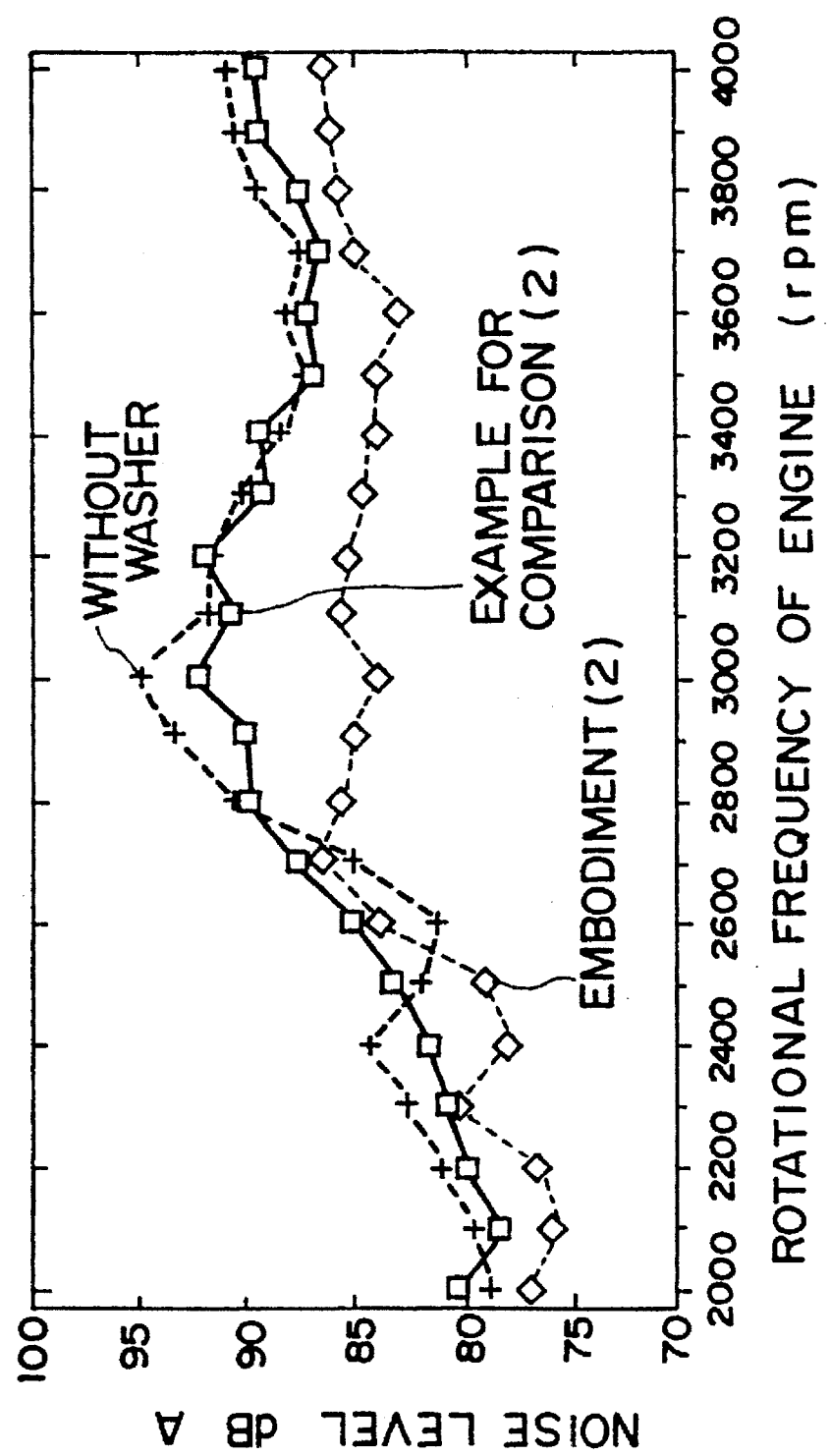
FIG. 17 is a graph indicating vibration isolation sound insulation characteristics of the vibration isolation washers according to the EMBODIMENT (2) and the EXAMPLE FOR COMPARISON (2)
Figure 18:
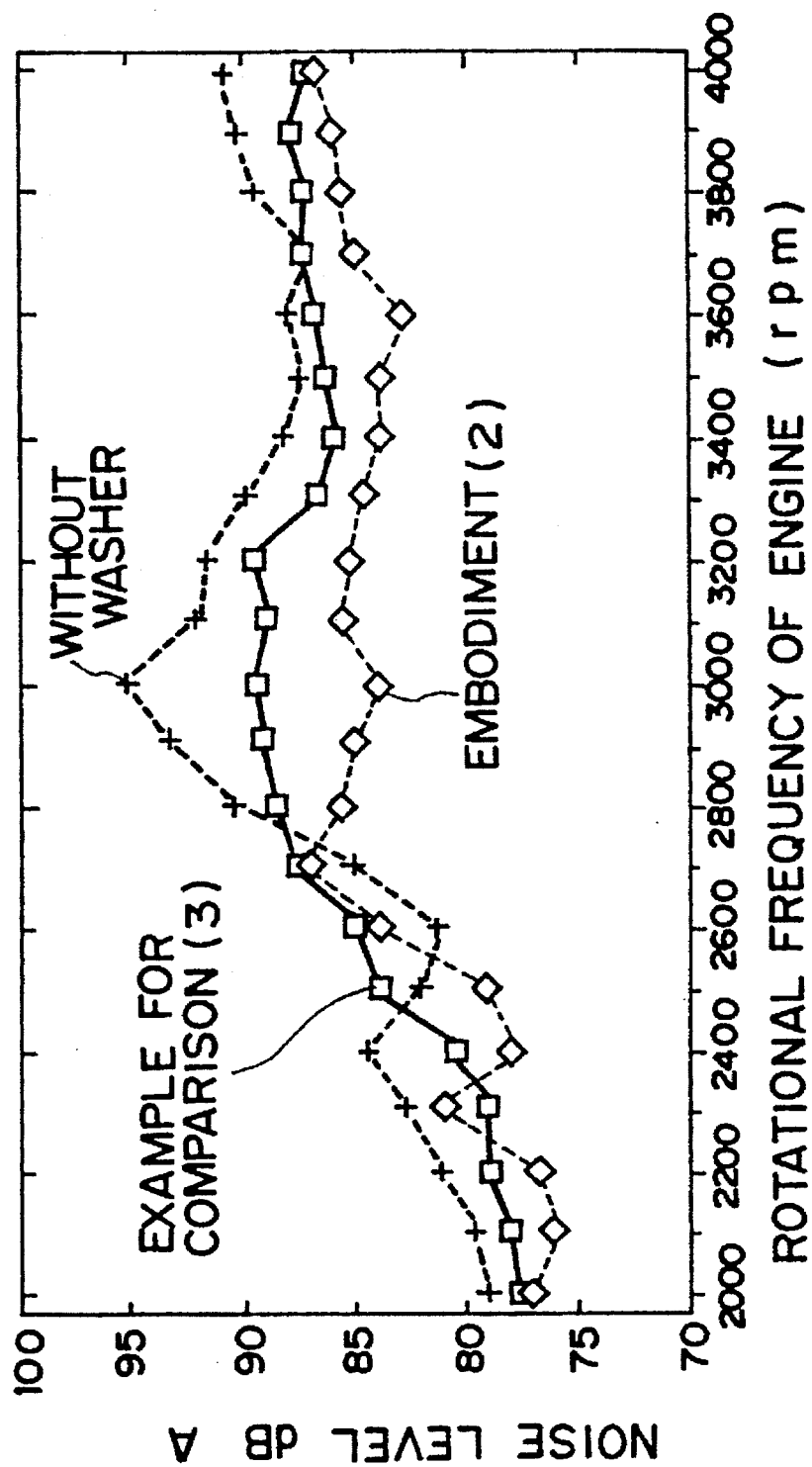
FIG. 18 is a graph indicating vibration isolation sound insulation characteristics of the vibration isolation washers according to the EMBODIMENT (2) and the EXAMPLE FOR COMPARISON (3)

A vibration isolation-washer according to the present example for comparison is constructed by molding a NBR type rubber piece 7 3.5mm thick and sticking it with a support 1 mm thick made of iron by vulcanization and adhesion, as indicated in FIG. 14. This is one of the vibration isolation washers most widely utilized heretofore.

This thickness of the rubber piece is overwhelmingly great among the embodiments and examples for comparison described above and 1.8 times as great as that used in EMBODIMENT (1).

The graphs indicated in FIGS. 15, 16, 17 and 18 show vibration isolation and sound insulation characteristics obtained in EMBODIMENTS (1), (2) and (3) and EXAMPLES FOR COMPARISON (1), (2) and (3).
METHOD FOR MEASURING VIBRATION ISOLATION AND SOUND INSULATION CHARACTERISTICS Sound pressure levels corresponding to different rotational frequencies of engine are measured by using a bench test apparatus for an engine of an automobile.

Vibration isolation washers according to the embodiments and the examples for comparison are used for all the parts clamped by bolts binding an engine head cover to a cylinder head to be tested.

At first, the bodies to be tested are clamped to the head cover with a constant torque. Thereafter the engine is started and the rotational frequency is increased with a constant interval.

Equivalent sound pressure level is measured for every rotational frequency at a position 15cm high over the central portion of the head cover by means of a sound pressure meter.

The sound pressure level is compared while paying attention specifically to a resonance peak sound pressure level found at 2400 ~ 3400 rpm and further for characteristic rotational frequency at need, when vibration isolation washers are used and not used.

The resonance sound pressure level is 95$d$B(A), in the case where no vibration isolation washers are used.

A higher sound insulating effect can be expected for vibration isolation washers giving lower sound pressure levels.

Figure 19:
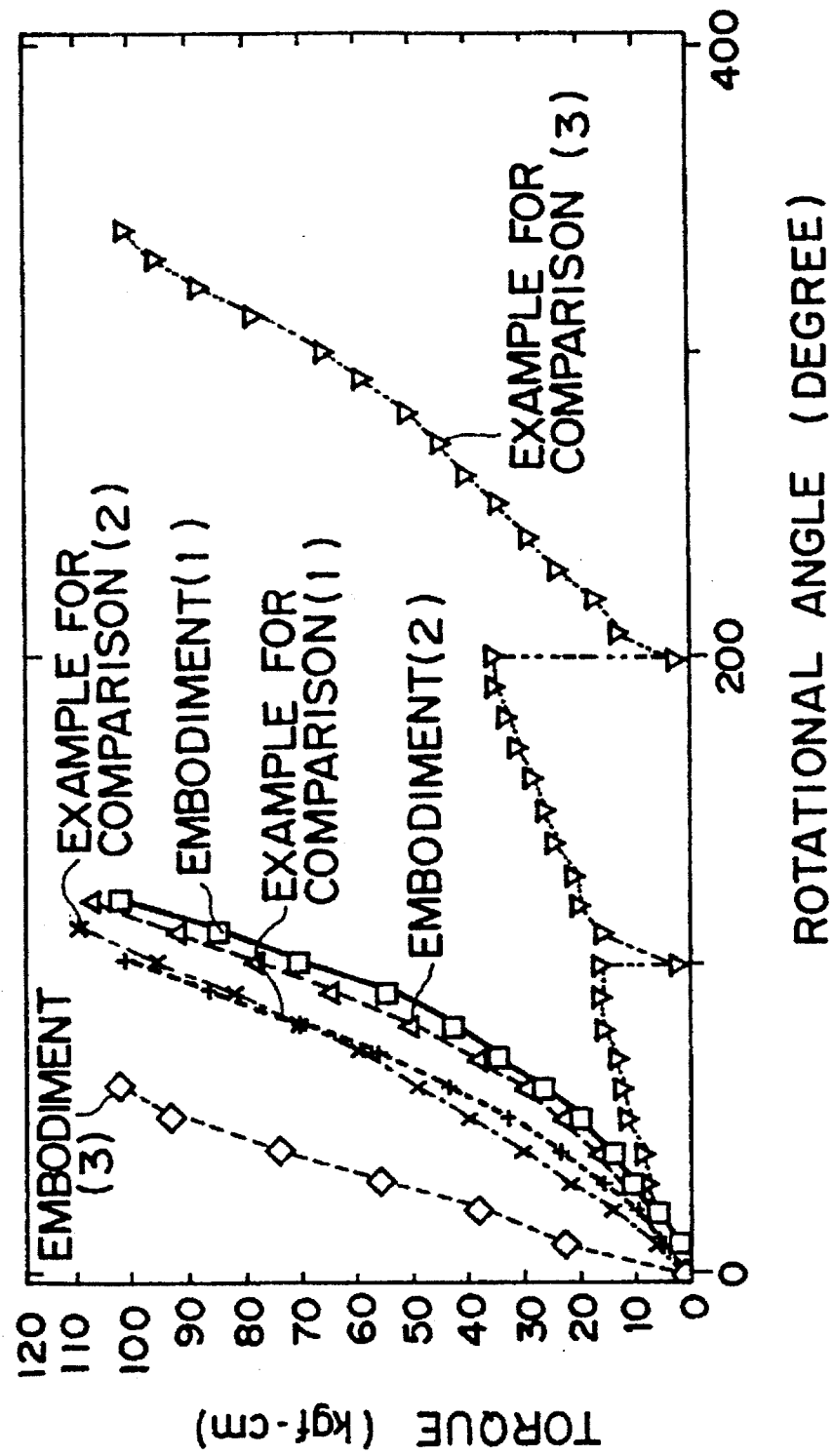
FIG. 19 is a graph indicating stable clamping properties of the vibration isolation washers according to the EMBODIMENTS (1) to (3) and the EXAMPLES FOR COMPARISON (1) to (3)
Figure 20:
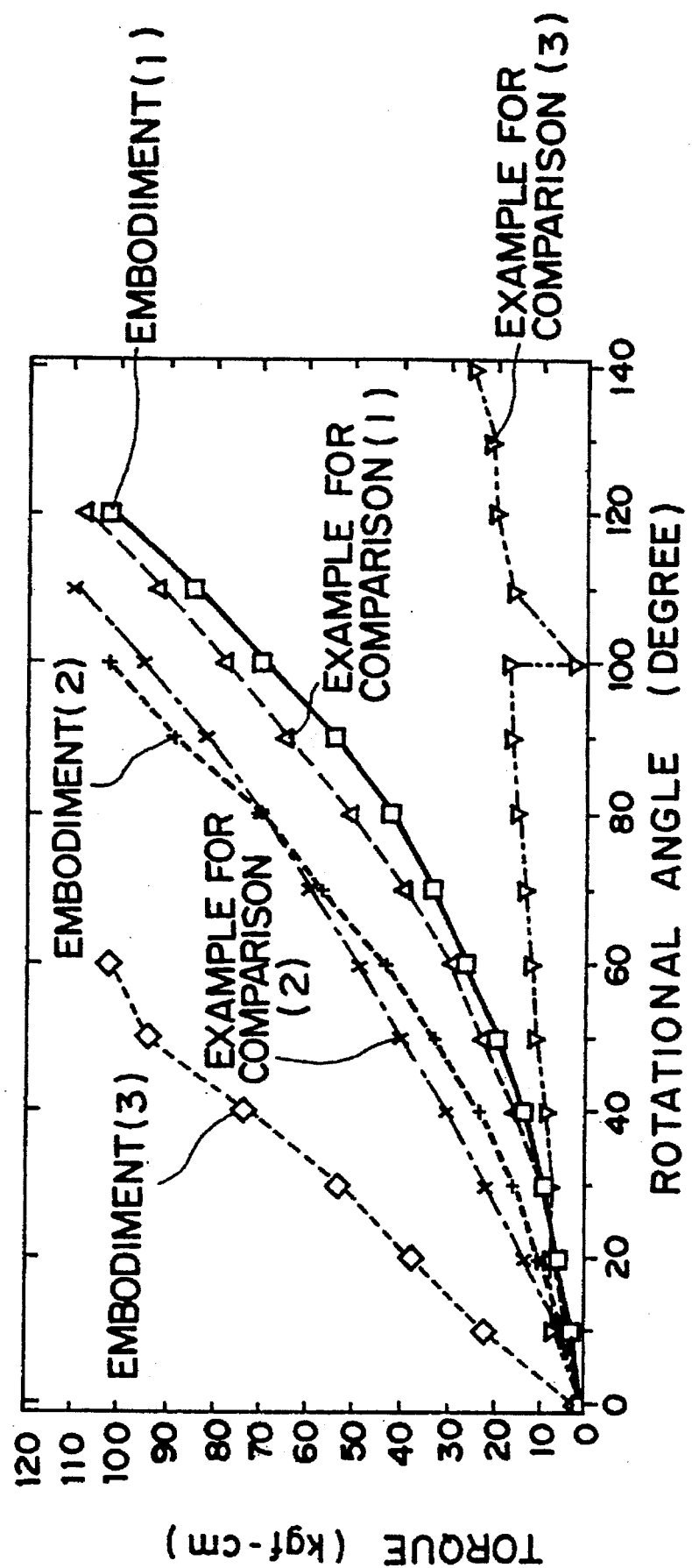
FIG. 20 is a graph enlarging a part of FIG. 19.

Torque transmissibilities are indicated in the graph in FIG. 19. FIG. 20 shows an enlarged graph of a part thereof.
METHOD FOR MEASURING TORQUE TRANSMISSIBILITY A relation between the rotational angle of a torque wrench and the attainable torque is measured, when bodies to be tested are clamped to an aluminium plate, in which female screws are formed.

Here torque transmissibility is evaluated by using a rotational angle necessary for clamping torque to arrive at 100 kgf-cm. The torque transmissibility is higher and more stable clamping is possible, when this value is smaller.

Figure 21:
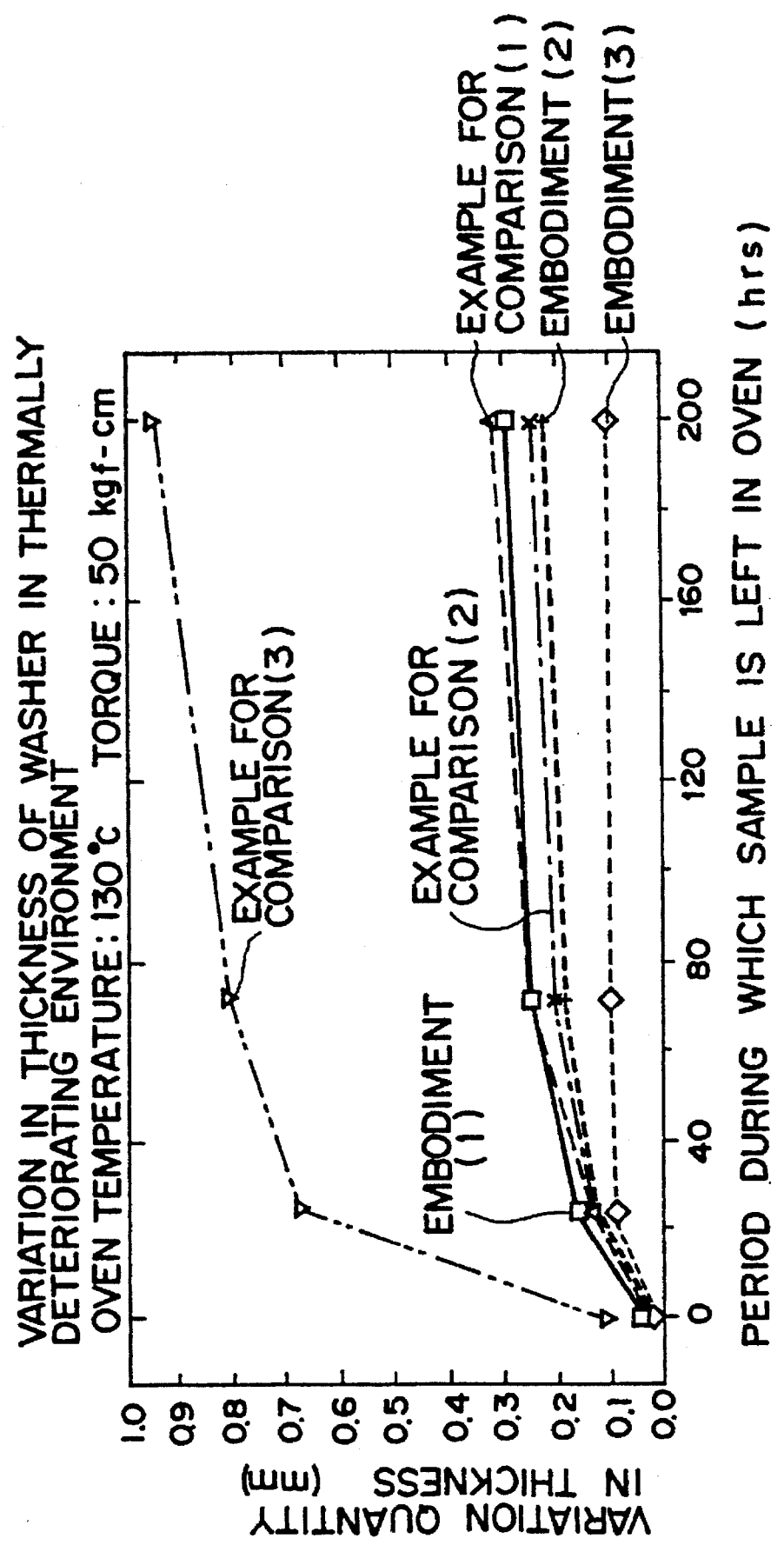
FIG. 21 is a graph indicating compression sets of the vibration isolation washers according to the EMBODIMENTS (1) to (3) and the EXAMPLES FOR COMPARISON (1) to (3)
Figure 22:
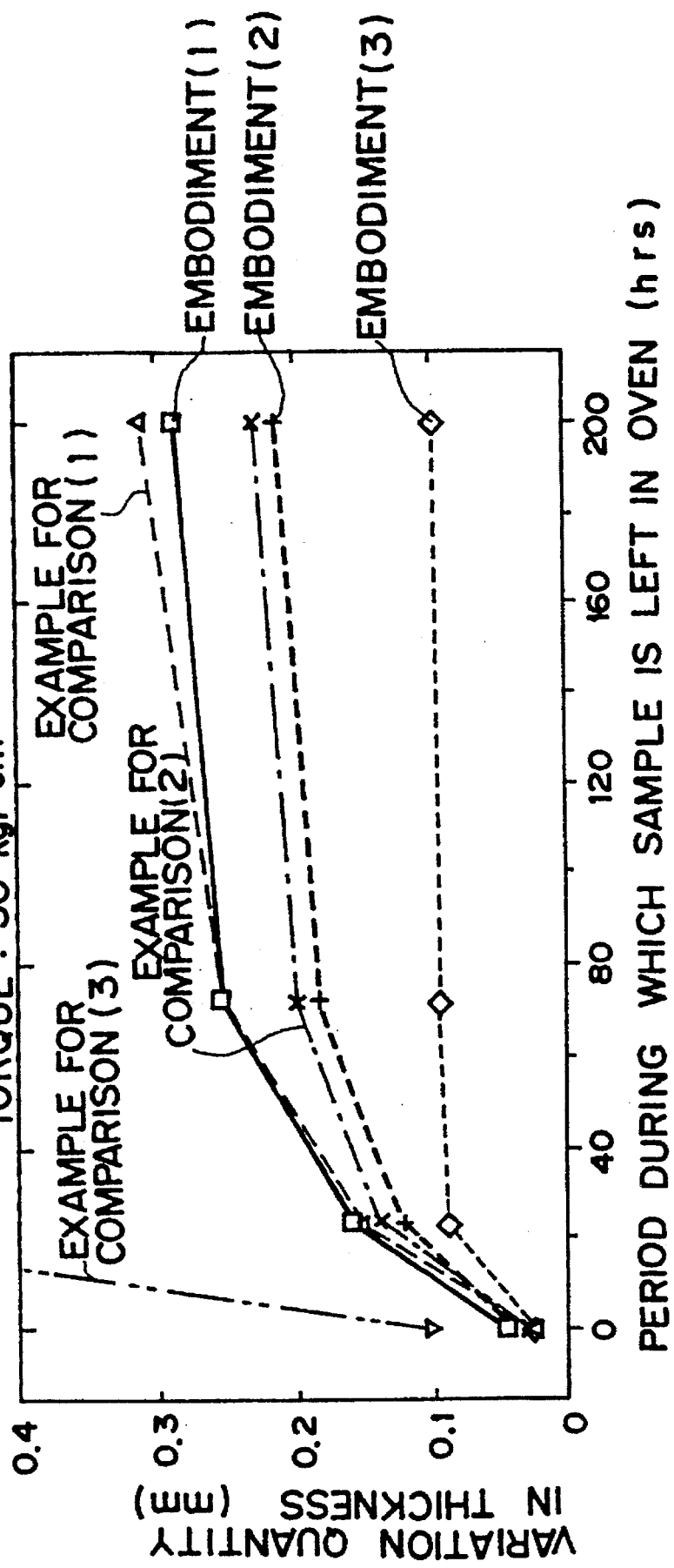
FIG. 22 is a graph enlarging a part of FIG. 21.

Compression set, which is an index for the long term creep property, is indicated in the graph in FIG. 21. FIG. 22 is an enlarged graph of a part of FIG. 21.
METHOD FOR MEASURING COMPRESSION SET Bodies to be tested are clamped to an aluminium plate, in which female screws are formed, by a bolt with a constant toque. Variations in the thickness of the bodies to be tested after having left them in long periods of time under thermally deteriorating environment are measured and the aspect thereof is observed.

Here thermally deteriorating environment is 130° C.× 200 hours and bodies to be tested are clamped with a torque of 50 kgf-cm.

Looseness of the bolt is smaller and a higher remaining torque can be kept, when variations in the thickness are smaller.

Now results of performance tests effected for the vibration isolation washers described in the embodiments and the examples for comparison will be indicated.

PERFORMANCE RESULTS FOR EMBODIMENT (1)

Vibration Isolation and Sound Insulating Property:

The sound pressure level at the resonance peak is about 85$d$B(A) and sound pressure levels for other rotational frequencies are also kept generally low. The attenuation level of the sound level is really as great as 10$d$B, compared with that obtained in the case where no washers are used. The highest sound insulating effect can be obtained among the embodiments and the examples for comparison.
Torque Transmissibility:

The rotational angle is 120°C., which is about ⅓ of that obtained for EXAMPLE FOR COMPARISON (3).
Long Term Creep Resistant Property:

Variations in the thickness are about 0.3mm. No protrusions of the rubber visco-elastic layers are found and the aspect after the test is good.

PERFORMANCE RESULTS FOR EMBODIMENT (2)

Vibration Isolation and Sound Insulating Property:

The sound pressure level at the resonance peak is about 86$d$B(A). Although it is somewhat higher than that obtained for EMBODIMENT (1), the attenuation level of the sound pressure is as higher as 9$d$B with respect to that obtained without washer.

Although results show that the sound pressure level is higher by about 3$d$B than that obtained for EMBODIMENT (1) around 3000rpm, it is lower than 85$d$B(A) for all the rotational frequencies and a high sound insulating property is maintained.

Torque Transmissibility:

The rotational angle is 100° C. and thus a more excellent torque transmissibility is realized.

Long Term Creep Resistant Property:

Variations in the thickness are about 0.2mm. No protrusions of the rubber visco-elastic layers, etc. are found and the aspect after the test is good.

PERFORMANCE RESULTS FOR EMBODIMENT (3)

Vibration Isolation and Sound Insulating Property:

The sound pressure level at the resonance peak is about 88$d$B(A). Although it is somewhat higher than that obtained for EMBODIMENT (2), decrease in the sound pressure level is as high as 7$d$B with respect to that obtained without washer and a high sound insulating effect is exhibited.

Torque Transmissibility:

The rotational angle is 58° C. and thus a more excellent torque transmissibility is realized.

Long Term Creep Resistant Property:

Variations in the thickness are about 01.mm. No protrusions of the rubber visco-elastic layers, etc. are found and the aspect after the test is good.

What can be said for all the embodiments is that all the characteristics are influenced strongly by the thickness of the rubber layers and the number of basic components laminated on each other. That is, the sound insulating property is increased with increasing thickness of the rubber layers and increasing number of basic components laminated on each other. On the contrary, the torque transmissibility and the long term creep resistant property are worsened with increasing thickness of the rubber layers and increasing number of basic components laminated on each other. However, in any case, differences therebetween are small and it is possible to select characteristic suitable for any object of use.

PERFORMANCE RESULTS OF EXAMPLE FOR COMPARISON (1)

Vibration Isolation and Sound Insulating Property:

The sound pressure level at the resonance peak is about 85$d$B(A). There are no differences in the sound pressure level from EMBODIMENT (1). (However an upward shift of the peak rotational frequency is found.)

However, with respect to EMBODIMENT (1) worsening by 2 to 3$d$B is found over the whole middle rotational frequency region and the "vibration attenuation effect by caulking by means of pawls" is verified.

Torque Transmissibility:

The rotational angle is 115° C. and there are no differences from EMBODIMENT (1).

Long Term Creep Resistant Property:

Variations in the thickness are about 0.3mm and there are no differences from EMBODIMENT (1).

No protrusions of the rubber visco-elastic layers from the end portions are found and the aspect after the test is good. However peeling of rubber layers due to rubbing at the rubber surface of different basic components is found and exposure of metal is recognized partly.

PERFORMANCE RESULTS OF EXAMPLE FOR COMPARISON (2)

Variation Isolation and Sound Insulating Property:

The sound pressure level at the resonance peak is about 92$d$B(A), which is higher by 6$d$B than that obtained in EMBODIMENT (2). On the other hand, it is decreased by about 3$d$B with respect to that obtained without washer.

Further it is worsened by 2 to 5$d$B over the whole rotational frequency region.

It is believed that this is due to the fact that the effects of "vibration absorption by Coulomb friction" and "vibration attenuation by caulking by means of pawls" cannot be exhibited by adhesion on the whole interfaces between the different basic components, and thus usefulness of the present invention can be verified.

Torque Transmissibility:

The rotational angle is 105°C. Since it is at the same level as in EMBODIMENT (2), it is believed that influences of the adhesion on the whole interfaces between the different basic components are small.

Long Term Creep Resistant Property:

Variations in the thickness are 0.2mm. No protrusions of the rubber visco-elastic layers, etc. are found and the aspect after the test is good.

PERFORMANCE RESULTS OF EXAMPLE FOR COMPARISON (3) Vibration Isolation and Sound Insulating Property:

The sound pressure level at the resonance peak is about 90$d$B(A), which is somewhat higher than those obtained in EMBODIMENTS (1), (2) and (3). Although the rubber visco-elastic layers is thickest in embodiments and examples for comparison, decrease in the sound pressure level is only 5$d$B with respect to that obtained without washer.

Torque Transmissibility:

The rotational angle is as great as 340°C. This means that rubber flows to the right and left at clamping and in addition torque return due to torsion of rubber is confirmed.

Long Term Creep Resistant Property:

Variations in the thickness are about 0.9 to 1.0mm, which are three to ten times as great as those obtained in embodiments. Further protrusions and breaks of the rubber visco-elastic layers are found after the test.

As indicated by the performance of the vibration isolation washers according to embodiments described previously, it is possible to obtain a vibration isolation washer excellent in the vibration isolation and sound insulation property. The torque transmissibility and the long term creep resistant property by applying the present invention thereto.

That is, since the vibration isolation washer according to the present invention is constructed by using raw materials, in each of which a rubber visco-elastic layer or such layers is or are disposed on one or two surfaces of a metal plate, which raw materials are positioned adjacent each other, so that rubber visco-elastic layers are opposite to each other, and by mechanically coupling them to each other to form a single body and by laminating laminated bodies thus obtained or laminated, it is possible to realize not only a vibration attenuation effect by rubber visco-elastic layers but also an excellent "torque transmissibility" and "long term creep resistant property" owing to the fact that the total quantity of rubber visco-elastic layers in the overall thickness is necessarily reduced and the amount of compression in every rubber visco-elastic layer is remarkably suppressed.

Further, owing to the fact that after having aligned a plurality of basic components described previously on each other, they are assembled in one body not by adhesion between the different basic components, but by spot connection by caulking mechanically all the layers by means of pawls cut and raised in the thickness direction, it is possible not only to prevent "torsion of the rubber visco-elastic layers" generated at clamping and contribute to an excellent "torque transmissibility" and "prevention to damage rubber surfaces", but also to introduce new vibration isolating mechanisms such as a "friction damping effect by Coulomb friction" and a "vibration attenuation effect by prolongation and complication of the vibration transmission path".

Although the thickness of each of rubber visco-elastic layers laminated on each other cannot be defined generally, depending on the material as far as the embodiments described above concern, satisfactory results can be obtained, if it is comprised between 0.03 and 0.50mm. However, ideally, if it is comprised between 0.03 and 0.20mm, further satisfactory results can be obtained.

As described above, by using a vibration isolation washer constructed as described previously, to which the present invention is applied, the effect thereof can be exhibited at most by combining efficiently vibration isolation mechanisms described below.

One of them is the "vibration attenuation effect by visco-elasticity of rubber". This is not specifically new, prior art vibration isolation washers (using rubber) utilize this mechanism.

Concerning a vibration isolation washer, to which the present invention is applied, a higher vibration isolation property (sound insulation property) can be obtained with increasing number of layers laminated on each other in the multi-layered body, each of which constitutes a basic component, that is, with increasing total thickness of the rubber visco-elastic layers laminated alternately with metal plates. This corresponds to a mechanism wherein vibration energy is transformed into thermal energy by internal friction in the rubber visco-elastic layers and as the result vibration isolation is obtained.

A second mechanism is the "vibration energy absorbing effect by Coulomb friction", which is one of the new vibration isolation mechanisms according to the present invention.

This is a mechanism, wherein extremely small "Coulomb friction" is produced at interfaces between different layers positioned over each other, when vibration takes place, owing to the fact that the different layers serving as basic components are not adhered to each other, but they are only brought into contact with each other at surfaces other than spot connections. In this way, vibration energy is transformed into friction heat and thus a high vibration absorbing effect can be obtained.

A third mechanism is a "vibration attenuation effect by prolongation and complication of the vibration transmission path, which is another vibration isolation mechanism according to the present invention.

This means that a number of chances for attenuating vibration owing to the fact that, when vibration inputted to the vibration isolation washers is transmitted within the washer, it traces a complicated long transmission path by binding all the layers laminated on each other by spot connection, caulking them mechanically by means of pawls cut and raised in the thickness direction.

Many advantages can be obtained by using the three vibration isolation mechanisms in the optimum manner in combination.

In the case where the first mechanism is used, from the point of view of the vibration isolation, for the purpose of securing the overall thickness of the rubber visco-elastic layers giving a better vibration isolation property than that obtained by a prior art vibration isolation washer, it is sufficient to increase the thickness of each of the rubber layers and/or the number of layers laminated on each other. However the thickness of the rubber layers, which can exhibit a high vibration isolation, is fairly great. Further since it is a composite body with metal plates, overall thickness is very great and it cannot be said to be practical.

Further, if each of the rubber layers is thin and the metal plates are thick, not only mechanical strength thereof is lowered, but also bad influences are given on the "compression resistant property", the "creep resistant property", the "environment resistant property", etc., and in addition a vibration isolation washer thus obtained is almost identical to prior art one, which is deviated from the purpose of the improvement aimed by the present invention.

Therefore it is possible to increase the vibration isolation due to rubber visco-elasticity by keeping each of the rubber visco-elastic layers as thin as possible, and to increase the vibration isolation satisfying simultaneously the compression resistant property, the creep resistant property and the environment resistant property at maximum by complementing insufficient vibration isolation, which exists naturally, mutually with the second and the third vibration isolation mechanism.

Further the "mechanical spot connecting means by means of pawls" is efficient not only for facilitating production of extremely small "Coulomb friction", which is the second mechanism, but also since it makes efficient use of mechanical strength of a metal material, it has effects of preventing peeling and breaking taking place together with torsion of rubber at initial clamping (torsion strength) and making it possible to transfer precisely torque. Therefore it can be said that it is inevitable for use as a vibration isolation washer, to which twisting torque is loaded necessarily.

In the case where basic components are simply arranged in a multi-layered body tentatively without using any "mechanical spot connecting means by means of pawls", not only the vibration isolation property owing to prolongation and complication of the vibration transmission path cannot be expected, but also mounting on a bolt takes much time. Further, even if there exists means for facilitating mounting on a bolt, since the different layers move freely at clamping, unnecessary friction is produced at interfaces of rubber/ rubber or rubber/metal, which gives rise to such inconvenience that surfaces of rubber layers are worn or they are peeled.

In addition, the "mechanical spot connecting means by means of pawls" is fabricated by processing basic components and requires no other "auxiliary materials". In the case where a space for mounting the vibration isolation washer is restricted, this gives rise to many advantages that it is possible to design the size of the washer so that the area necessary for vibration isolation is as large as possible, that it is not necessary to take into account chemical and physical influences of the "auxiliary materials" on the mounting portion, etc.

Now on example, in which the present invention is applied to a pressed construction of a ventilation babble plate in an oil pan for a vehicle, will be explained below.

Figure 23:
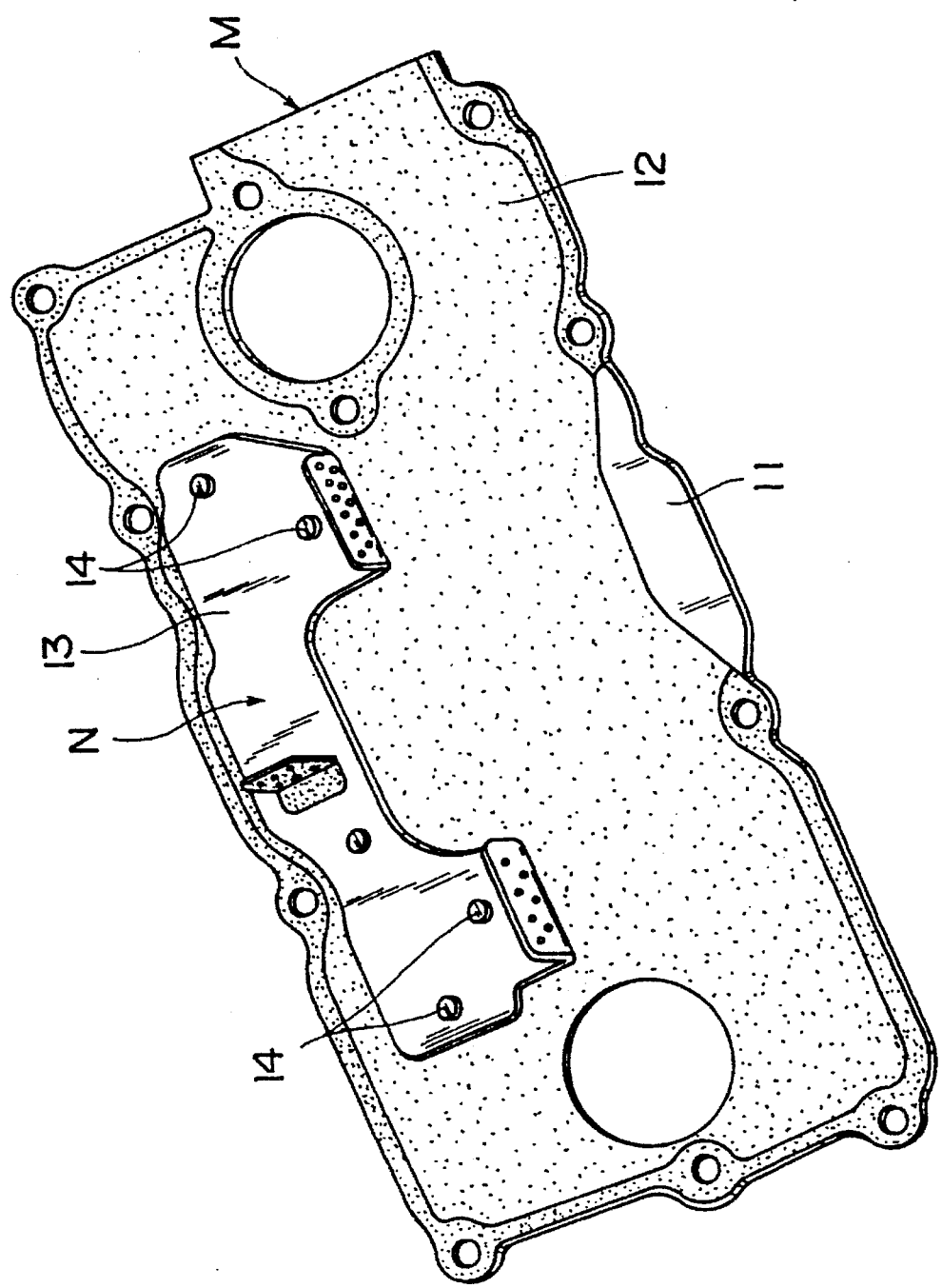
FIG. 23 is a perspective view of a part of a pressed construction indicating another embodiment of the present invention.

FIG. 23 is a perspective view of a ventilation babble plate and FIGS. 24A to 24H show various sorts of constructions of the spot connections.

In FIG. 23, M is a pressed construction, in which reference numeral 11 is a metal plate serving as a rigid base plate and 12 is a rubber visco-elastic layer having a sealing property, which is formed by adhesion to a surface of the metal plate, and N is a plate member positioned on the rubber visco-elastic layer 12, which is composed of only a metal plate 13, which is bound to the metal plate 11 of the pressed construction at four points by spot connection by means of rivets 14.

Figure 24A:
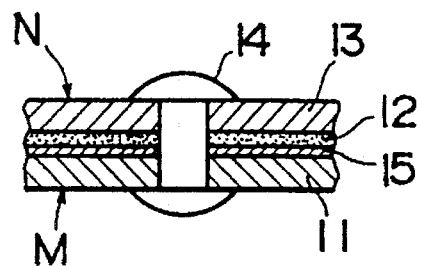
FIGS. 24A to 24H are enlarged cross-sectional views indicating examples of various sorts of spot connections.
Figure 24B:
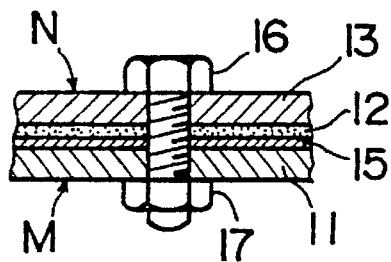
Figure 24C:
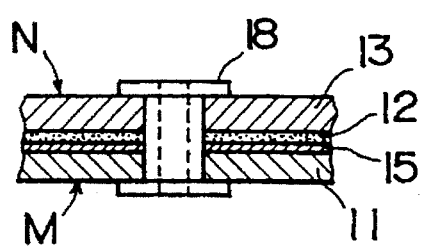
Figure 24D:
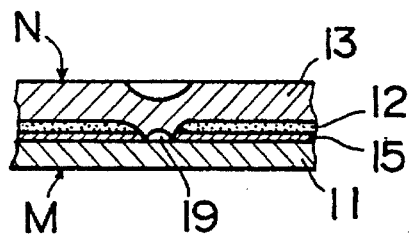
Figure 24E:
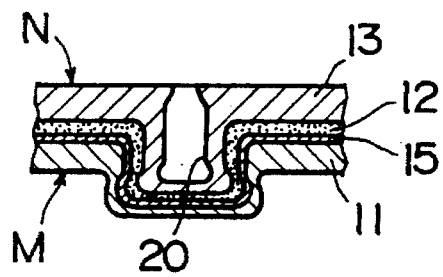

FIG. 24A is an enlarged cross-sectional view of a spot connection portion by a rivet 14 indicated in FIG. 23. In the figure, reference numeral 15 is an adhesive layer adhering the rubber visco-elastic layer 12 to the metal plate 11. For this spot connection, apart from the rivet, a screw spot connection using a bolt 16 and a nut 17 indicated in FIG. 24B; a spot connection using an eyelet 18 indicated in FIG. 24C; a spot connection by means of a spot welding portion 19 indicated in FIG. 24D; a spot connection by means of a caulked portion 20 indicated in FIG. 24E, etc. may be arbitrarily chosen, depending on material, thickness, etc. of the base plate and the plate member. Further the number of spot connections, the interval between adjacent two spot connections, etc. may be arbitrarily determined, depending on the construction described above. Not only a metal plate but also a hard plastic plate, a ceramic plate, etc. may be used for the rigid base plate described above.

As described above, the construction of a part where the metal plate—of the plate member N is stuck by spot connection is metal plate—rubber visco-elastic layer— metal plate constituting a constrained vibration damping construction. However, contrarily to the fact that in a prior art constrained vibration damping material different constituting members are stuck in one body by adhesion, in the construction described above, since the plate member N and the pressed construction M are bound mechanically loosely to each other, in the case where vibration is applied to the pressed construction M, a slight bend is produced in the pressed construction M and in this way slight slide takes place between the rubber visco-elastic layer 12 in the pressed construction M and the metal plate 13 serving as the plate member. In this case, since visco-elastic materials such as rubber are hardly slidable with respect to metal, friction takes place therebetween and vibration can be absorbed by this friction force.

The plate member N described above is not necessarily brought into contact with the whole surface of the pressed construction, but it is possible to make it exhibit the greatest vibration damping effect by bringing it into contact with the pressed construction at the place, where vibration is greatest due to resonance effect, etc., with a necessary smallest area.

Further, in the case where the pressed construction M is constructed only by using a rigid body, a member, which is formed by adhering one or two macromolecular visco-elastic layers on one or two surfaces of a rigid body, may be used for the plate member N so as to have such structure that this or these macromolecular visco-elastic layers is or are stuck with the base plate by spot connection.

Figure 24F:
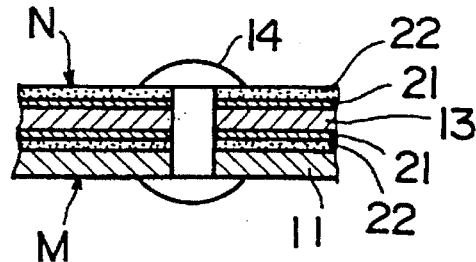
Figure 24G:
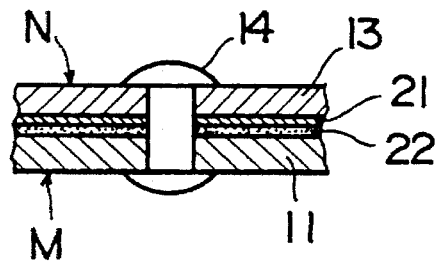
Figure 24H:
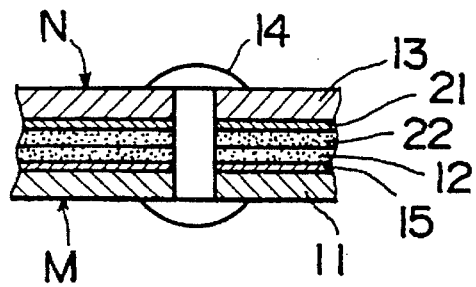

FIGS. 24F and 24G show examples of the construction, in which the rigid base plate in the pressed construction M is composed of only a metal plate 11, while a member, which is formed by adhering one or two rubber visco-elastic layers 22 on one or two surfaces of a metal plate 13 through one or two adhesive layers 21, is used for the plate member N, and this is laminated on the metal plate 11 stated above, which are bound with each other by spot connection by means of a rivet 14. Particularly the spot connection indicated in FIG. 24G can be applied to a case where no sealing parts are required for the construction. Also by these constructions effects similar to those described previously can be obtained. FIG. 24H shows an example of the construction, in which the plate member N is formed by adhering a rubber visco-elastic layer 22 to a surface of a metal plate 13 through an adhesive layer 21, which is laminated on the rubber visco-elastic layer 12 in the pressed construction M.

Consequently, when the present invention is applied for damping vibration of a pressed construction as described above, following effects can be obtained.

(1) Since a remarkable vibration damping effect can be obtained, it can be fabricated with a lower cost and a smaller weight with respect to the case where a whole pressed construction is fabricated with a constrained vibration damping material.

(2) In the case where a visco-elastic layer is formed on the pressed construction, since the layer has also a sealing function, the number of parts and the number of fabrication steps can be reduced.

(3) The number of parts, the number of mounting steps and cost of materials can be reduced by making the plate member serve also as a ventilation babble plate used for rectification or flow control of oil, water, blowby gas, etc.

Next experimental examples and experimental examples for comparison in the case where the present invention is applied to the pressed construction described above will be indicated below.

Figure 25:
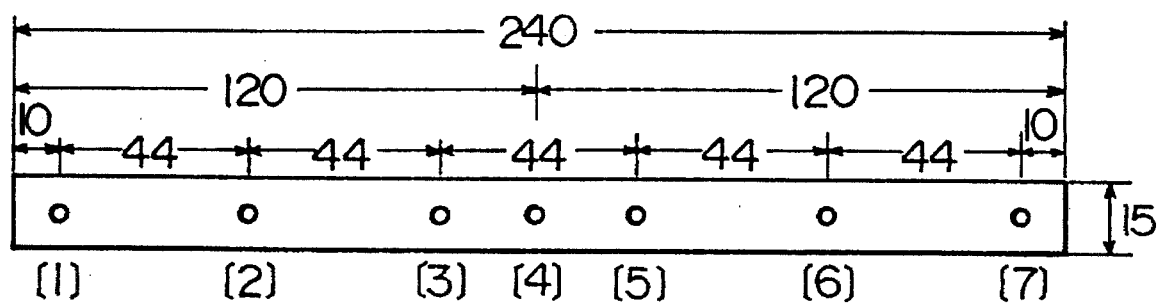
FIG. 25 is a plan view of a sample for measurements of a vibration damping body.
Figure 26:
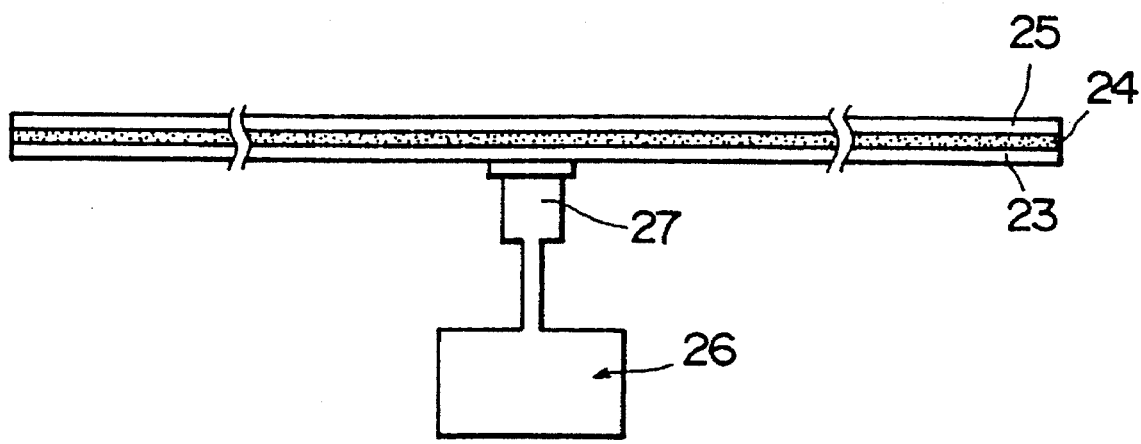
FIG. 26 is a diagram showing the construction of a measuring apparatus for a vibration damping body.

Samples to be Measured and Measurement Method:

A plate member 25 200μm thick having a length of 240mm and a width of 15mm is laminated on a rubber visco-elastic layer in an unconstrained vibration damping construction formed by adhering a rubber layer 24 200μm thick to an iron plate 23 0.8mm thick having the same length and width as the plate member as indicated in FIGS. 25 and 26, a construction obtained by spot-connecting them by means of a caulking processing at positions indicated by numerals (1) to (7) in the figure is used as a sample and vibration is applied to the central portion thereof by means of a dynamic electric type vibrator 26, the frequency of the applied vibration is varied while measuring force and vibration acceleration by using an impedance head 27 (adhered to the sample) inserted between different spot connections to measure mechanical impedance at a point where vibration is applied, and loss factor is calculated from a resonance curve.

Figure 27:
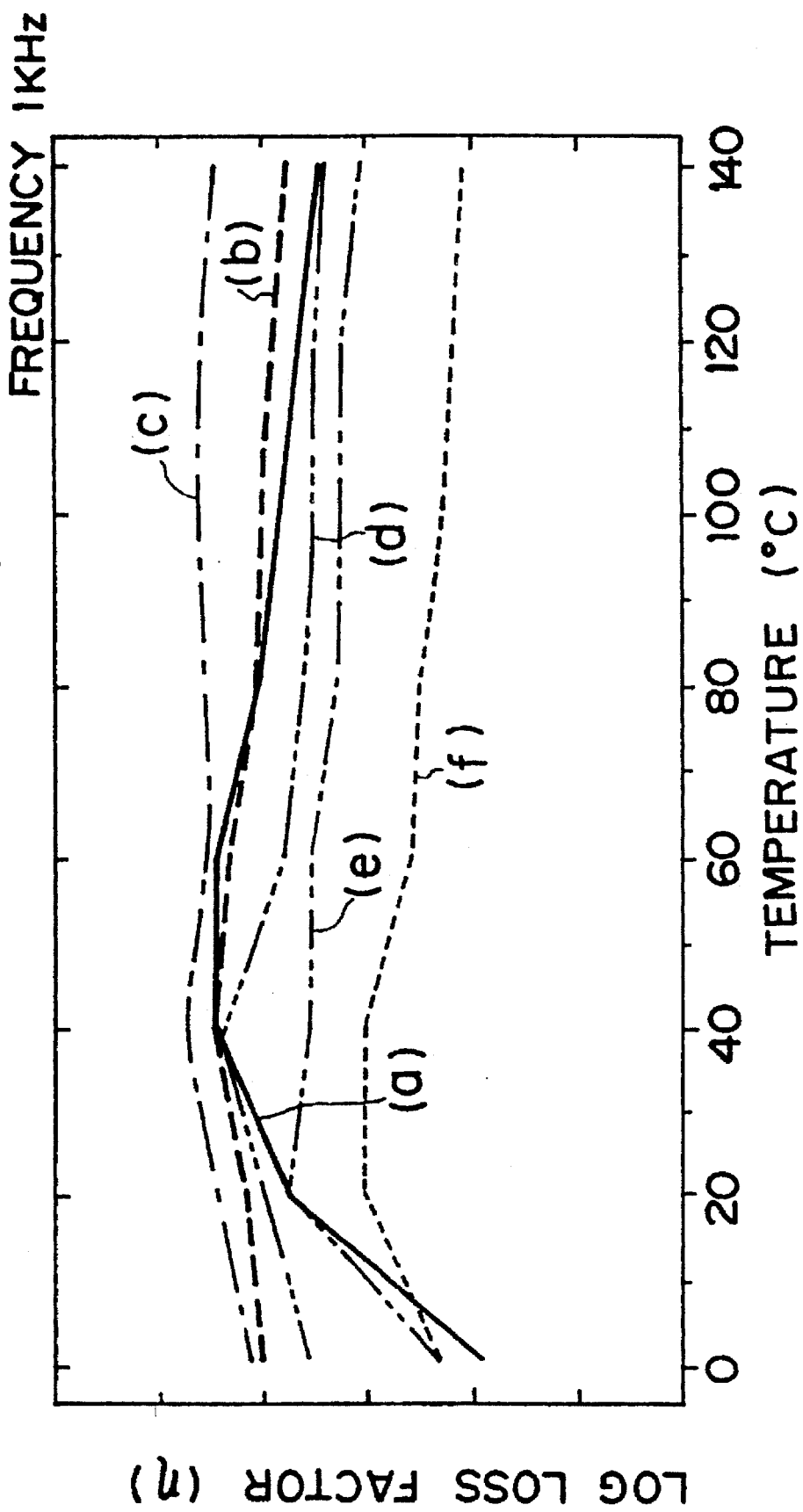
FIG. 27 is a graph indicating the loss factor in a measured embodiment.

FIG. 27 shows a loss factor ($\eta$) - temperature curve obtained by the experimental example described above.

Different curves indicated by (a), (b), (c), (d), (e) and (f) in the figure correspond to different spot connections described below. Here, particularly in order to clarify the effect of the spot connections, the number of spot connections per unit area is varied to verify the effect thereof.

Curve (a) . . . 6 spot connections at (1) to (3) and (5) to (7)

Curve (b) . . . 5 spot connections at (1), (2), (4), (6) and (7)

Curve (c) . . . 4 spot connections at (1), (3), (5) and (7)

Curve (d) . . . 3 spot connections at (1), (4), and (7)

Curve (e) . . . 2 spot connections at (1) and (7)

Curve (f) . . . 1 spot connection at (4)

According to results of the measurement stated above the vibration damping effect depicts a sharper peak with increasing number of spot connections and on the other hand, in the case where the number of spot connections decreases extremely, the vibration damping effect is lost rapidly.

This means that it becomes closer to the prior art constrained vibration damping structure formed by adhesion with increasing number of spot connections. When the number of spot connections increases, not only cost for adhesion increases, but also a result is obtained, which is different from the purpose of the present invention.

Further, in the case where the number of spot connections is 1 or 2, the contacting part between the plate member and the unconstrained vibration damping structure exists only in the neighborhood of the spot connected portion and they are almost not in contact with each other. Therefore no Coulomb friction can be produced and the vibration damping effect decreases rapidly.

For the other numbers of spot connections, since the vibration damping effect is at almost same levels and exhibits an almost identical temperature dependence, existence of the vibration damping effect by Coulomb friction is clear and it can be said it is a necessary condition that relevant frictional surfaces are in contact with each other at least between spot connected portions.

However this condition varies, depending on the area and rigidity of the construction bound by spot connection. Although the number of spot connections necessary for appearance of the vibration damping effect by friction cannot be defined, in order to be advantageous in cost, it is inevitable to determine a number of spot connections for an individual case, with which the smallest and efficient contacting interfaces are obtained.

Figure 28:
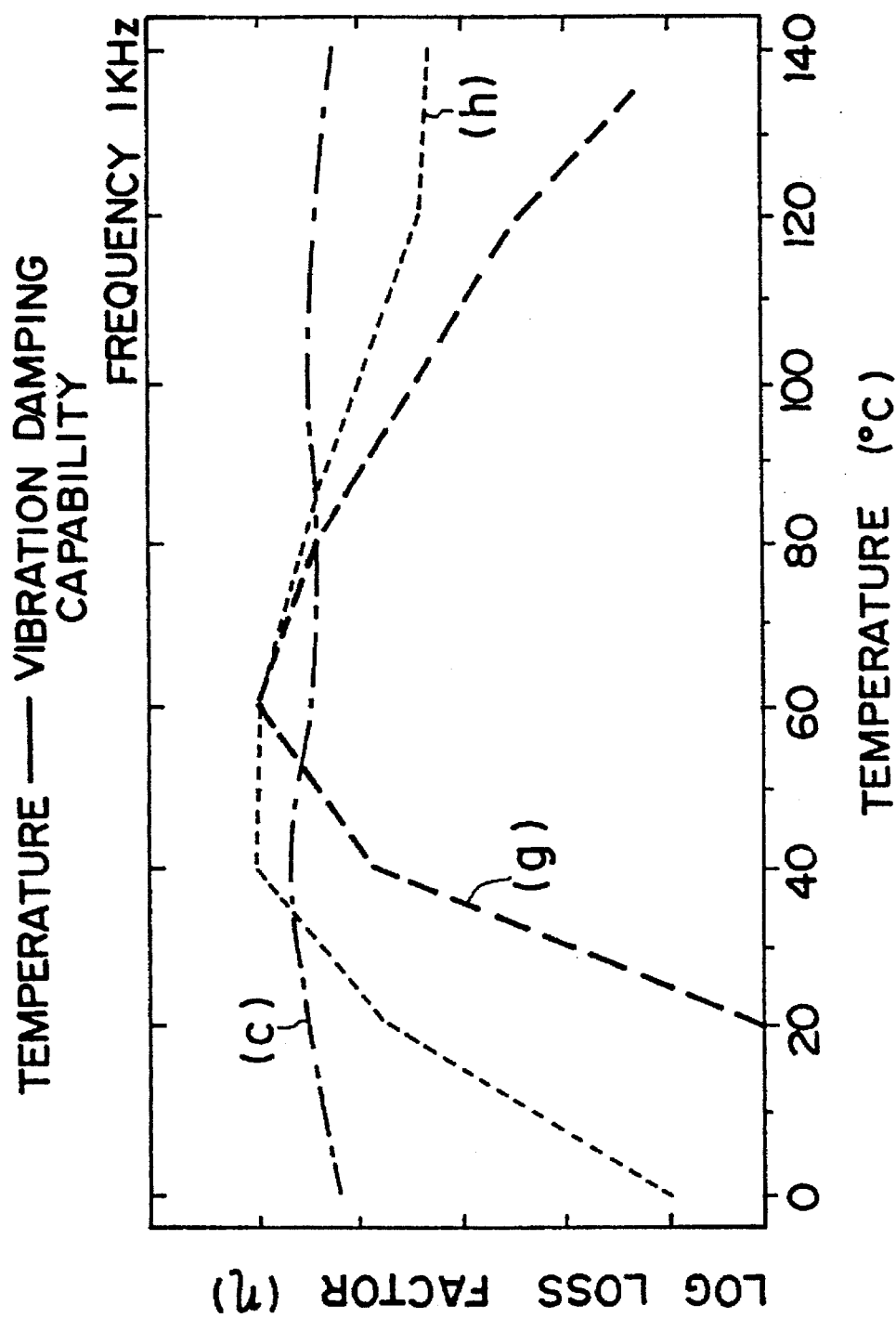
FIG. 28 is a graph comparing the measured embodiment and a measured example for comparison in the loss factor.

FIG. 28 shows loss factor ($\eta$) - temperature curves comparing the experimental examples described previously with experimental examples for comparison indicated below.

EXPERIMENTAL EXAMPLE FOR COMPARISON 1

This is an example wherein a construction similar to that obtained according to the present invention is formed by using a vibration damping steel plate (steel plate 0.5mm thick / resin layer 0.05mm thick / steel plate 0.5mm thick) on the market. Curve (c) is obtained by using the experimental example described previously having four spot connections, while Curve (g) is obtained by using the EXPERIMENTAL

EXAMPLE FOR COMPARISON 1.

In the case of the EXPERIMENTAL EXAMPLE FOR COMPARISON 1 described above, a sharp peak due to the dynamic visco-elasticity of the resin is in the neighborhood of 60° C. Although the level thereof is high, it is extremely low in other temperature regions.

Further, when the pressed construction is fabricated by deep embossment, break is produced in the embossed portion due to a difference between the two steel plates in elongation and it is recognized that further contrivance is necessary for a suitable processing.

EXPERIMENTAL EXAMPLE FOR COMPARISON 2

This is an example wherein a plate member is stuck by adhesion to a rubber layer acting as a seal of unconstrained vibration damping structure used for realizing the present invention. Curve (h) in FIG. 28 is obtained by using the

EXAMPLE FOR COMPARISON 2.

For adhesion of the plate member described above, phenol type thermosetting adhesive is used for obtaining strong adhesion.

Since the part of unconstrained vibration damping structure is made of one steel plate, it can be processed without giving rise to break, etc. by a prior art embossing fabrication method. However the vibration damping effect is greatest in the neighborhood of 50° C. due to the dynamic visco-elastic layer made of rubber and although the peak is somewhat broader than that obtained in EXPERIMENTAL EXAMPLE FOR COMPARISON 1, it is lower in level around it.

As described above, in the case where the present invention is applied to a vibration damping washer, in spite of the fact that it is so thin and has a rigidity so high that it disproves conventional common sense, not only it can realize a vibration isolation and sound insulation property higher than that obtained by a prior art vibration isolation rubber, but also for the torque transmissibility the rotational angle till a predetermined torque can be suppressed to ⅓ to ⅙ and for the long term creep resistant property the amount of variation in thickness can be reduced to ⅓ to ¹⁄₁₀. In addition, since the exposed surface of rubber is small, it is possible to obtain an epoch-making vibration isolation washer, which can realize an overwhelmingly good environment resistant property.

Further, when the present invention is applied to a pressed construction such as an oil pan, a ventilation babble plate, etc. for an automobile, following effects can be obtained.

In a pressed construction using a prior art constrained vibration damping structure the vibration damping effect thereof depends strongly on the dynamic visco-elasticity of the constrained macromolecular visco-elastic layer. As the result, although temperature characteristics of the vibration damping effect thus obtained has a large peak in the neighborhood of the glass transition point of the macromolecular visco-elastic body, only an extremely small vibration damping effect can be obtained in lower and higher temperature regions and it cannot be fit for use, particularly in the case where it is used in a wide temperature region from the room temperature (20° C.) to a high temperature (150° C.) as in the neighborhood of an engine for an automobile.

On the contrary, when the present invention is applied thereto, although it has a three-layered structure similar to a prior art constrained vibration damping structure, an apparent constrained vibration damping structure can be obtained by binding the plate-shaped member to the unconstrained vibration damping construction in one body by spot connections such as rivet, screw, caulking, spot welding, etc. without adhesion. It can be said that this is a point, where the present invention differs remarkably from prior art techniques.

That is, owing to the spot connection described above, strictly speaking, different layers are not adhered with each other except for the spot connections, but they are only in contact with each other. Consequently, at vibration, as described previously, between the plate-shaped member and the visco-elastic body used in the unconstrained vibration damping structure, force making them move with respect to each other is produced. At this time, Coulomb friction is produced between the surface of the macromolecular visco-elastic body having a high friction coefficient and the plate-shaped member. Vibration energy is transformed into thermal energy by this "Coulomb friction and vibration is absorbed in this way.

Since the Coulomb friction does not depend in principle on temperature, if it is in a temperature region where the Coulomb friction effect of the macromolecular visco-elastic body is maintained, the vibration damping effect is kept almost constant and as the result, it can exhibit the vibration damping effect in a wide temperature region.

However, corresponding to the fact that the vibration damping effect is kept constant, it has no remarkable peak at a certain temperature, which is found for a prior art vibration damping steel plate, and the constrained vibration damping structure is more advantageous at that temperature. However, it can be said that, in the case where the effect should be exhibited in a wide temperature region as around an engine for a vehicle, etc., it is the best way to utilize the vibration damping by friction described above.

In this way, since not only processing difficult for a prior art vibration damping steel plate (deep embossment, etc.) but also many others can be dealt with by prior art techniques, it is advantageous in cost and a high vibration damping effect (noise suppressing effect) can be obtained in a wide temperature region.

Further it has an advantage that a sealing and a vibration damping function can be utilized in common by utilizing a sealing function of the surface of the macromolecular visco-elastic layer, using the pressed construction, in which a macromolecular visco-elastic layer or such layers are formed on an inner surface or both surfaces of a metal plate.

What is claimed is:

1. A vibration damping body comprising:

two rigid bodies, each said rigid body having an exposed surface;

a first macromolecular visco-elastic layer integrally secured to said exposed surface of a first one of said rigid bodies; and a plurality of spaced apart spot connecting assemblies for securing said rigid bodies together so that said exposed surface of a second of said rigid bodies is located adjacent said first macromolecular-visco-elastic layer without being integrally bonded to said visco-elastic layer, each said spot connecting assembly including a member associated with one said rigid body and directed toward the other said rigid body and an opening formed in the other said rigid body for receiving said member, said spot connecting assemblies being further configured to allow said rigid bodies to move relative to each other.

2. The vibration damping body of claim 1, wherein said first visco-elastic layer has a thickness between 0.03 and 0.50 mm.

3. The vibration damping body of claim 1, wherein each said spot connecting assembly includes a pawl integrally formed with one said rigid body directed toward said other said rigid body so as to be disposed in said opening formed in said other rigid body.

4. The vibration damping body of claim 1, wherein each said spot connecting assembly includes a rivet extending from one said body into said opening formed in the other said rigid body.

5. The vibration damping body of claim 1, further including a second macromolecular visco-elastic layer adhesively secured to said exposed surface of said second rigid body so that when said rigid bodies are secured to each other, said visco-elastic layers abut without being integrally secured together.

6. A vibration damping washer comprising:

first and second metal plates, each said metal plate having an exposed face, said metal plates arranged so that said exposed faces are disposed toward each other;

at least two rubber visco-elastic layers wherein a first said visco-elastic layer is integrally bonded to an exposed face of a first said metal plate and a second said visco-elastic layer is secured to said first visco-elastic layer by an adhesive layer located therebetween; and a plurality of spaced apart spot connecting assemblies for securing said metal plates together so that said second metal plate is located adjacent said second visco-elastic layer and is not integrally attached to said visco-elastic layer so that said metal plates can vibrate relative to each other, each said spot connecting assembly including a member associated with one said metal plate that is directed to the other said metal plate and an opening formed in the other said metal plate for receiving said member.

7. A vibration damping body for a vibration isolation washer according to claim 6, wherein said rubber visco-elastic layer has a thickness in a region comprised between 0.03 and 0.5 mm.

8. The vibration damping body of claim 6, further including a third visco-elastic layer integrally bonded to said exposed face of second metal plate wherein said third visco-elastic layer abuts said second visco-elastic layer and is not integrally secured thereto.

9. The vibration damping washer of claim 6, further including:

a third metal plate integrally bonded to an exposed surface of said first metal plate second visco-elastic layer;

a third visco-elastic layer is bonded to a surface of said third metal plate distal from said second visco-elastic layer; and a fourth visco-elastic layer bonded to said exposed surface of said second metal plate wherein said second metal plate is positioned so that said associated fourth visco-elastic layer abuts said third visco-elastic layer and is not integrally bonded thereto.

10. The vibration damping washer of claim 9 further including:

a fifth visco-elastic layer integrally bonded to an exposed surface of said first metal plate distal from said surface to which said first visco-elastic layer is bonded;

a fourth metal plate located adjacent said fifth visco-elastic layer;

a sixth visco-elastic layer bonded to an exposed surface of said fourth metal plate so as to be located adjacent said fifth visco-elastic layer; and additional spot connecting assemblies for securing said fourth metal plate to said first metal plate so that said fifth and sixth visco-elastic layers are not integrally bonded together so that said metal plates can vibrate relative to each other, 11. The vibration damping washer of claim 10 further including:

a fifth visco-elastic layer integrally bonded to an exposed surface of said first metal plate distal from said surface to which said first visco-elastic layer is bonded;

a fourth metal plate located adjacent said fifth visco-elastic layer;

a sixth visco-elastic layer bonded to an exposed surface of said fourth metal plate so as to be located adjacent said fifth visco-elastic layer; and additional pawl and opening pairs associated with said first and fourth metal plates for securing said fourth metal plate to said first metal plate so that said fifth and sixth visco-elastic layers are not integrally bonded together.

12. The vibration damping washer according to claim 6, wherein each said spot connecting assembly comprises:

pawls cut and raised at a plurality of positions in one of said metal plates, said pawls directed to said openings formed in said other of said metal plates, said pawls being formed integrally with said metal plate from which said pawls extend and said pawls being bent so as to mechanically secure said metal plates together.

13. The vibration damping body of claim 12, further including a third visco-elastic layer integrally bonded to said exposed face of second metal plate wherein said third visco-elastic layer abuts said second visco-elastic layer and is not integrally secured thereto.

14. The vibration damping washer of claim 6, further including:
    a third metal plate integrally bonded to an exposed surface of said first metal plate second visco-elastic layer;
    a third visco-elastic layer is bonded to a surface of said third metal plate distal from said second visco-elastic layer; and
    a fourth visco-elastic layer bonded to said exposed surface of said second metal plate wherein said second metal plate is positioned so that said associated fourth visco-elastic layer abuts said third visco-elastic layer without being integrally bonded thereto.

15. A vibration damping body for a pressed construction comprising:
    a rigid base plate;
    a macromolecular visco-elastic layer adhered to said rigid base;
    a plate-shaped member positioned over said macromolecular visco-elastic layer; and
    a plurality of spot connecting assemblies for securing said plate-shaped member to said rigid base plate without integrally bonding said plate-shaped member to said visco-elastic layer wherein said spot connecting assemblies are configured so as to allow said plate-shaped member to vibrate on said visco-elastic layer; each said spot connecting assembly including a tab associated with said plate-shaped member that extends into a complimentary opening formed in said rigid base plate.

16. The vibration damping body according to claim 15, wherein said macromolecular visco-elastic layer consists of a rubber visco-elastic layer having a sealing property.

17. The vibration damping body according to claim 15, wherein each said spot connecting tab is a rivet that extends into a complimentary opening formed in said rigid body.

18. The vibration damping body according to claim 15, wherein each said spot connecting tab is a stud formed in said plate-shaped member and said rigid base is formed with a recessed opening for receiving said stud, and said visco-elastic layer surrounds said portion of said rigid base defining said recessed opening.

19. A method for fabricating a vibration damping body for a vibration isolation washer comprising the steps of:
    making a plurality of first basic components by forming rubber visco-elastic layers on both sides of a plurality of metal plates
    making a plurality of second basic components, each of which consists of two said basic components adhered to each other wherein said second basic components are manufactured by adhesively securing visco-elastic layers of adjacent first basic components to each other;
    aligning a plurality of second basic components over each other, wherein said visco-elastic layers of adjacent second basic components abut each other; and
    mechanically connecting said second basic components together at a plurality of spaced apart locations with fingers that extend between one said second basic component into openings formed in the adjacent said second components so that said abutting visco-elastic layers associated with adjacent said second basic components are not integrally bonded together and said second basic components are able to vibrate relative to each other.

20. A method for fabricating a vibration damping body for a vibration isolation washer comprising:
    making a plurality of first basic components by forming a rubber visco-elastic layer on one side of a plurality of metal plates;
    making a plurality of second basic components by forming rubber visco-elastic layers on both sides of a plurality of metal plates;
    making at least one third basic component by adhering two said second components to each other so that abutting visco-elastic layers of adjacent said second components are integrally bonded to each other;
    positioning first basic components on opposed sides of a said third basic component so that said visco-elastic layers of said first basic components abut said opposed visco-elastic layers of said third basic component; and
    mechanically securing said first basic component to said third basic component at a plurality of spaced apart locations without bonding said visco-elastic layers of said first basic components to said abutting visco-elastic layers of said third basic component so that said basic components can shift positions relative to each other.

* * * * *

UNITED STATES PATENT AND TRADEMARK OFFICE
CERTIFICATE OF CORRECTION

PATENT NO. : 5 489 180
DATED : February 6, 1996
INVENTOR(S) : Sunao ICHIHARA, et al It is certified that error appears in the above-indentified patent and that said Letters Patent is hereby corrected as shown below:

```
Column 21, line 8; change "claim 6" to ---claim 12---.
Column 22, line 5; change "plates" to ---plates;---.
```

Signed and Sealed this

Twenty-fifth Day of June, 1996

Attest:

BRUCE LEHMAN

Attesting Officer

Commissioner of Patents and Trademarks